(12) United States Patent
Russo et al.

(10) Patent No.: US 12,190,331 B1
(45) Date of Patent: Jan. 7, 2025

(54) APPARATUS AND METHOD FOR CARBON EMISSION OPTIMIZATION USING MACHINE-LEARNING

(71) Applicant: PITT-OHIO, Pittsburgh, PA (US)

(72) Inventors: Justine Russo, Pittsburgh, PA (US); Stephen Milcoff, Pittsburgh, PA (US)

(73) Assignee: PITT-OHIO, Pittsburgh, PA (US)

( * ) Notice: Subject to any disclaimer, the term of this patent is extended or adjusted under 35 U.S.C. 154(b) by 0 days.

(21) Appl. No.: 18/420,168

(22) Filed: Jan. 23, 2024

(51) Int. Cl.
| | |
|---|---|
| *G06Q 10/10* | (2023.01) |
| *G06N 20/00* | (2019.01) |
| *G06Q 10/04* | (2023.01) |
| *G06Q 30/018* | (2023.01) |
| *G06Q 30/02* | (2023.01) |
| *G06Q 30/06* | (2023.01) |

(52) U.S. Cl.
CPC .......... *G06Q 30/018* (2013.01); *G06N 20/00* (2019.01); *G06Q 10/04* (2013.01)

(58) Field of Classification Search
CPC ....... G06Q 30/018; G06Q 10/04; G06N 20/00
USPC .......................................... 705/1.1–912, 317
See application file for complete search history.

(56) References Cited

U.S. PATENT DOCUMENTS

| | | | |
|---|---|---|---|
| 8,498,818 B1* | 7/2013 | Jones, Jr. ............. | G06Q 10/083 |
| | | | 702/182 |
| 9,430,777 B1* | 8/2016 | Strand .............. | G06Q 10/08345 |
| 11,403,689 B2 | 8/2022 | Sanchez | |
| 2021/0108937 A1 | 4/2021 | Fox | |
| 2022/0067751 A1* | 3/2022 | Sanchez ........... | G06Q 10/08345 |
| 2022/0138636 A1* | 5/2022 | Gedeon .................. | G06Q 30/06 |
| | | | 705/6 |
| 2022/0358515 A1* | 11/2022 | Kahn ...................... | G06F 30/27 |
| 2023/0186217 A1 | 6/2023 | Kulkarni | |
| 2024/0144153 A1* | 5/2024 | Dohrn .................. | G06Q 30/018 |

FOREIGN PATENT DOCUMENTS

WO 2022/204352 A1 9/2022

* cited by examiner

*Primary Examiner* — Jonathan P Ouellette
(74) *Attorney, Agent, or Firm* — Caldwell Intellectual Property Law

(57) ABSTRACT

An apparatus for carbon emission optimization using machine-learning, apparatus including a processor and a memory containing instructions configuring the processor to receive an integrated logistics data collection, determine a projected carbon emission as a function of the integrated logistics data collection, generate a transportation plan as a function of the integrated logistics data collection and the projected carbon emission, continuously receive a current logistics datum from an external source, and iteratively modify the transportation plan based on the current logistics datum.

20 Claims, 6 Drawing Sheets

APPARATUS AND METHOD FOR CARBON EMISSION OPTIMIZATION USING MACHINE-LEARNING

FIELD OF THE INVENTION

The present invention generally relates to the field of machine-learning. In particular, the present invention is directed to apparatus and method for carbon emission optimization using machine-learning.

BACKGROUND

The transportation industry has been a cornerstone of global economic growth and development. As logistics networks have expanded, existing methods for projecting carbon emission and transportation planning are inadequate in addressing the dynamic update on transportation plan while maintaining desired environmental impact.

SUMMARY OF THE DISCLOSURE

In an aspect, an apparatus for carbon emission optimization using machine-learning is described. The apparatus includes at least a processor, and a memory communicatively connected to the at least a processor, wherein the memory contains instructions configuring the at least a processor to receive an integrated logistics data collection, determine at least one projected carbon emission as a function of the integrated logistics data collection, wherein determining the at least one projected carbon emission comprises, training a carbon emission projection model using carbon emission training data, wherein the carbon emission training data includes a plurality of logistics datasets as input correlated to a plurality of historical carbon emissions as output, and determining the at least one projected carbon emission as a function of the integrated logistics data collection using the trained carbon emission projection model. The processor is then configured to generate at least one transportation plan as a function of the integrated logistics data collection and the at least one projected carbon emission, continuously receive a current logistics datum from an external source, and iteratively modify the at least one transportation plan based on the current logistics datum, wherein iteratively modifying the at least one transportation plan includes identifying a carbon emission outlier as a function of the current logistics datum and the trained carbon emission projection model, determining at least one carbon emission offset as a function of the carbon emission outlier, and updating the transportation plan to incorporate the at least one carbon emission offset.

In another aspect, a method for carbon emission optimization using machine-learning is described. The method includes receiving, using at least a processor, an integrated logistics data collection, determining, using the at least a processor, at least one projected carbon emission as a function of the integrated logistics data collection, wherein determining the at least one projected carbon emission includes training a carbon emission projection model using carbon emission training data, wherein the carbon emission training data contains a plurality of logistics datasets as input correlated to a plurality of historical carbon emissions as output, and determining the at least one projected carbon emission as a function of the integrated logistics data collection using the trained carbon emission projection model. The method further includes generating, using the at least a processor, at least one transportation plan as a function of the at least one projected carbon emission, continuously receiving, using the at least a processor, a current logistics datum from an external source, and iteratively modifying, using the at least a processor, the at least one transportation plan, wherein iteratively modifying the at least one transportation plan includes identifying a carbon emission outlier as a function of the current logistics datum and the trained carbon emission projection model, determining at least one carbon emission offset as a function of the carbon emission outlier, and updating the transportation plan to incorporate the at least one carbon emission offset.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for carbon emission optimization using machine-learning is described. The apparatus includes at least a processor, and a memory communicatively connected to the at least a processor, wherein the memory contains instructions configuring the at least a processor to receive an integrated logistics data collection, determine at least one projected carbon emission as a function of the integrated logistics data collection, wherein determining the at least one projected carbon emission comprises, training a carbon emission projection model using carbon emission training data, wherein the carbon emission training data includes a plurality of logistics datasets as input correlated to a plurality of historical carbon emissions as output, and determining the at least one projected carbon emission as a function of the integrated logistics data collection using the trained carbon emission projection model. The processor is then configured to generate at least one transportation plan as a function of the integrated logistics data collection and the at least one projected carbon emission, continuously receive a current logistics datum from an external source, and iteratively modify the at least one transportation plan based on the current logistics datum, wherein iteratively modifying the at least one transportation plan includes identifying a carbon emission outlier as a function of the current logistics datum and the trained carbon emission projection model, determining at least one carbon emission offset as a function of the carbon emission outlier, and updating the transportation plan to incorporate the at least one carbon emission offset.

Figure 1:
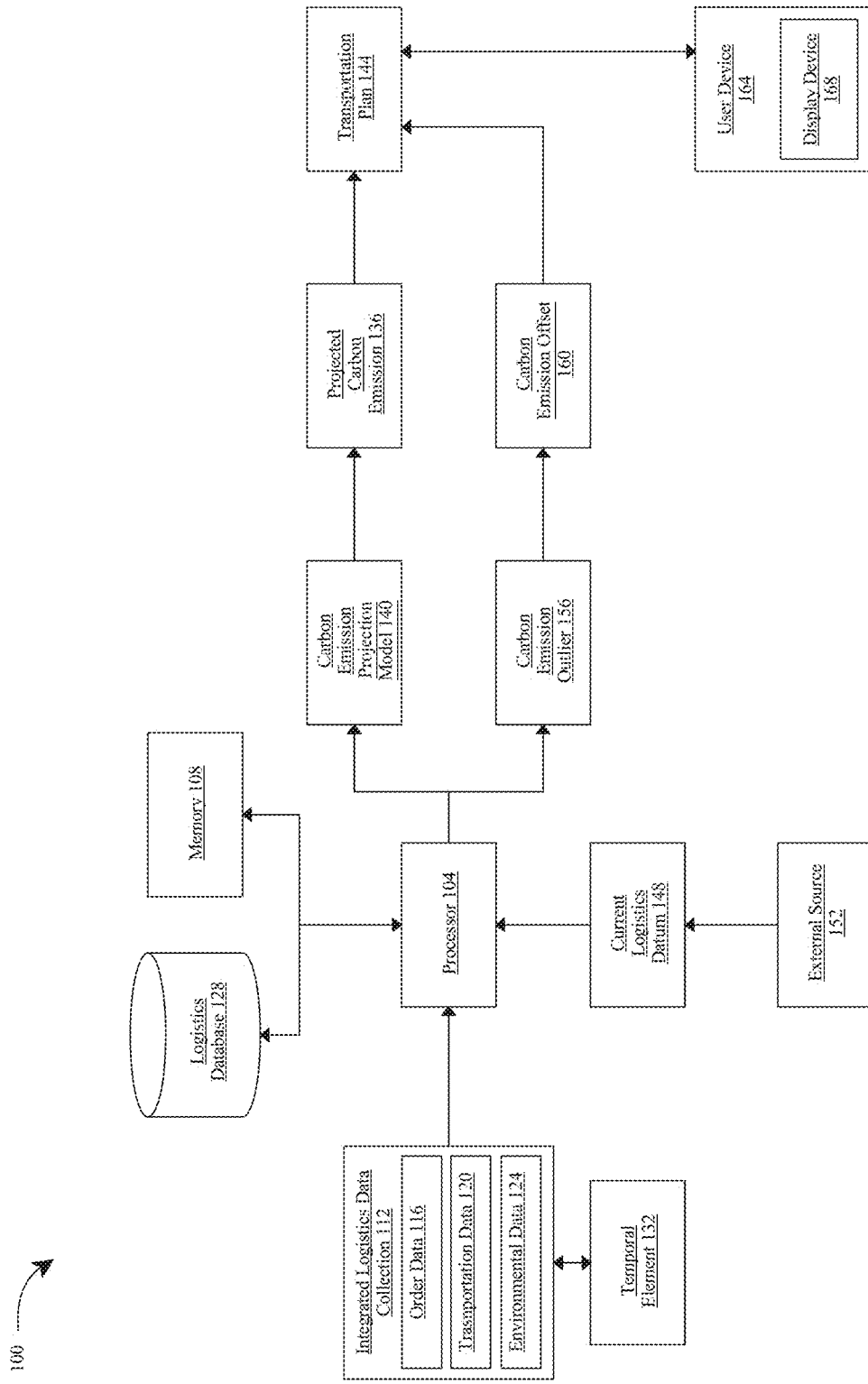
FIG. 1 is a block diagram of an exemplary embodiment of an apparatus for carbon emission optimization using machine-learning.

Referring now to FIG. 1, an exemplary embodiment of an apparatus 100 for carbon emission optimization is illustrated. Apparatus 100 includes a processor 104. Processor 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Processor 104 may include a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. Processor 104 may be implemented using a "shared nothing" architecture in which data is cached at the worker, in an embodiment, this may enable scalability of apparatus 100 and/or computing device.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, processor 104 may perform determinations, classification, and/or analysis steps, methods, processes, or the like as described in this disclosure using machine-learning processes. A "machine-learning process," as used in this disclosure, is a process that automatedly uses a body of data known as "training data" and/or a "training set" (described further below in this disclosure) to generate an algorithm that will be performed by a Processor module to produce outputs given data provided as inputs; this is in contrast to a non-machine learning software program where the commands to be executed are determined in advance by a user and written in a programming language. A machine-learning process may utilize supervised, unsupervised, lazy-learning processes and/or neural networks, described further below.

With continued reference to FIG. 1, apparatus 100 includes a memory 108 communicatively connected to processor 104, wherein the memory 108 contains instructions configuring processor 104 to perform any processing steps described herein. As used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, and without limitation, using a bus or other facility for intercommunication between elements of a processor 104. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, processor is configured to receive an integrated logistics data collection 112. As used in this disclosure, an "integrated logistics data collection" refers to an aggregation of a plurality of data points and/or datasets, each describing one or more aspects of logistics. In some cases, plurality of data points and/or datasets may be received from a plurality of sources, such as, without limitation, suppliers, transportation providers, warehouses, distribution centers, customer feedbacks, inventory management records, among others. In other cases, integrated logistics data collection 112 may be derived from real-time monitoring systems, such as, without limitation, GPS tracking, RFID scanning, IoT-enabled devices, and/or the like, providing live updates on one or more datapoints and/or datasets within integrated logistics data collection 112. In a non-limiting example, processor 104 may collect data from one or more data management systems, such as order management system, warehouse inventory tracking system, customer review system. Additionally, or alternatively, integrated logistics data collection 112 may be received from third party entities, for example, and without limitation, third-party delivery partners. Exemplary embodiments of integrated logistics data collection are described below.

In an embodiment, and still referring to FIG. 1, integrated logistic data collection 112 may include order data 116. As used in this disclosure, "order data" are data describing specific details related to customer orders. In some cases, order data 116 may encompass information such as product type, quantity, dimension, destination, order date, expected delivery date, and any special handling or shipping requirements. In a non-limiting example, order data 116 may include physical attribute data (i.e., information associated with one or more physical characteristics) of a product or a plurality of products specified in each order, wherein the physical attribute data may include length, width, and height of the product or a package of the plurality of products. In other embodiments, order data 116 may also capture payment details, customer preferences, feedback or ratings associated with one or more previous orders.

With continued reference to FIG. 1, in another embodiment, integrated logistic data collection 112 may include transportation data 120. As described herein, "transportation data" are data describing specific details associated with the movement of goods, including but not limited to, vehicle types, routes taken, fuel consumption, driver details, vehicle capacity, real-time location, and/or the like. In some cases, transportation data 120 may also capture specifics such as, without limitation, transportation costs, estimated time of arrivals, historical delays, vehicle maintenance records. For instance, and without limitation, transportation data 120 may indicate that a particular route frequently experiences delay due to traffic congestion, or that a specific vehicle has a higher fuel efficiency compared to other available vehicles for transporting the ordered products.

Additionally, or alternatively, and still referring to FIG. 1, transportation data 120 may include one or more transport request (i.e., communication associated with items or products that are sought to be shipped). In a non-limiting example, transportation data 120 may include data related to one or more communications from an operator or a driver requesting order data 116 e.g., weight or dimensions of cargo that is going or being transported. In another non-limiting example, transportation data 120 may further include one or more transportation configurations e.g., a selection of vehicle will be used to transport items or products, transportation costs associated with the transportation configurations, origin and destination, among others. In other embodiments, transportation data 120 may further include external datasets such as, without limitation, traffic prediction, construction notice, vehicle regulations, and/or the like.

With continued reference to FIG. 1, in a further embodiment, integrated logistic data collection 112 may include environmental data 124. For the purpose of this disclosure, "environmental data" refers to a set of information that captures a plurality of environmental factors and conditions that could potentially influence one or more logistics operations described herein. In some cases, environmental data 124 may include data points such as, without limitation, weather forecasts, temperature variations, humidity levels, air quality indices, geospatial data indicating terrains or natural barriers, among others. In a non-limiting example, environmental data 124 may reveal that a specific delivery route is prone to foggy conditions, which could impact vehicle average speed and delivery time. In another non-limiting example, environmental data 124 may include temperature variations which may be crucial for shipments that require controlled environments, such as perishable goods or sensitive electronics.

With continued reference to FIG. 1, other exemplary embodiments of integrated logistics data collection 112 may include, without limitation, warehouse and inventory data e.g., warehouse locations, inventory levels, handling procedures, and/or the like. In other embodiments, integrated logistics data collection 112 may include freight data, wherein the freight data may include any freight data described in U.S. patent application Ser. No. 18/418,442, filed on Jan. 22, 2024, and entitled "APPARATUS AND METHOD FOR PROJECTED CARBON EMISSION OF A TRANSPORT," entirety of which is incorporated herein by reference. An ordinary person skilled in the art, upon reviewing the entirety of this disclosure, would appreciate consolidating integrated logistic data collection 112 by incorporating various data as listed above in this disclosure.

Still referring to FIG. 1, processor 104 mat access order data 116, transportation data 120, environmental data 124, or any other data within integrated logistic data collection 112 described herein through one or more integration with fleet management systems, GPS tracking devices, meteorological databases, satellite feeds, IoT sensors strategically placed in key logistics points (e.g., warehouses, distribution centers, loading docks) or on transportation vehicles, or even direct input from one or more entities. In a non-limiting example, accessing order data 116 may include accessing order data 116 from an enterprise resource planning (ERP) system or directly from the ordered source e.g., e-commerce platform. In another non-limiting example, processor 104 may be configured to access transportation data 120 from vehicle telematics systems or transportation management software. In a further non-limiting example, receiving integrated logistic data collection 112 may include accessing environmental data 124 from national or regional meteorological services. environmental monitoring stations, sensing devices (e.g., temperature sensor, humidity sensor, pressure sensor, imaging sensor, and/or the like thereof) communicatively connected to processor 104. In some cases, Application programming interface or data bridges may be established between various external sources and processor 104 to facilitate real-time or batch data transfers. In other cases, processor 104 may retrieve integrated logistics data collection 112 directly or indirectly from cloud storage repositories (e.g., AWS Simple Storage Service, Elastic Block Store, or File system, MICROSOFT AZURE, GOOGLE cloud storage, and/or the like), local databases, or through any wireless data transmission methods. An ordinary person skilled in the art, upon reviewing the entirety of this disclosure, would recognize various data retrieval and integration in receipt of integrated logistic data collection 112 in consistent with this disclosure.

With continued reference to FIG. 1, in an embodiment, processor 104 may receive integrated logistic data collection 112 and/or any data described herein from a logistic database 128, wherein the logistic database 128 may be implemented, without limitation, as a relational database, a key-value retrieval database such as a NOSQL database, or any other format or structure for use as a database that a person skilled in the art would recognize as suitable upon review of the entirety of this disclosure. Logistic database 128 may alternatively or additionally be implemented using a distributed data storage protocol and/or data structure, such as a distributed hash table or the like. Logistic database 128 may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

With continued reference to FIG. 1, each data point or dataset within integrated logistic data collection 112 may be represented as a vector, wherein the "vector," as defined in this disclosure, is a data structure that represents one or more a quantitative values and/or measures of order data 116, transportation data 120, environmental data 124, or other related data described herein. A vector may be represented as an n-tuple of values, where n is one or more values, as described in further detail below; a vector may alternatively or additionally be represented as an element of a vector space, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other.

In a non-limiting example, and still referring to FIG. 1, order data 116 may include a data entry indicating an order with a volume of 100 units, high priority (represented or converted in a numeric scale from 1 to 10), and an estimated delivery time of 48 hours, may be represented as: $v_{order}=$ [100, 6, 48]. In another non-limiting example, transportation data 120 may include a data entry describing a truck with a capacity of 20 tons, currently moving at 60 miles per hour (mph), and having a fuel efficiency of 5 miles per gallon, may be represented as $v_{transportation}=$[20, 60, 5]. In some cases, at least two vectors may be combined into a single representation in integrated logistic data collection; for instance, and without limitation, both order data 116 and transportation data 120 may be represented as a single vector: $v_{combined}=$[100, 6, 48, 20, 60, 5].

Still referring to FIG. 1, two vectors may be considered equivalent where their directions, and/or the relative quantities of values within each vector as compared to each other, are the same; thus, as a non-limiting example, a second order vector [10.0, 0.6, 4.8] may be treated as equivalent, for purposes of this disclosure, as order vector $v_{order}$ as described above. Vectors may be more similar where their directions are more similar, and more different where their directions are more divergent, for instance as measured using cosine similarity as computed using a dot product of two vectors; however, vector similarity may alternatively or additionally be determined using averages of similarities between like attributes, or any other measure of similarity suitable for any n-tuple of values, or aggregation of numerical similarity measures for the purposes of loss functions as described in further detail below. Additionally, or alternatively, processor 104 may be configured to scale data from different sources, such that each data points or dataset represents each attribute along an equivalent scale of values. In an embodiment, integrated logistic data collection 112 represented as a collection of plurality of vectors may be "normalized," or divided by a "length" attribute, such as a length attribute 1 as derived using a Pythagorean norm:

$$l = \sqrt{\sum_{i=0}^{n} a_i^2},$$

where ai is attribute number i of the vector. Scaling and/or normalization may function to make vector comparison independent of absolute quantities of attributes, while preserving any dependency on similarity of attributes.

Still referring to FIG. 1, receiving integrated logistic data collection 112 may include aggregating data such as, without limitation, order data 116, transportation data 120, environmental data 124, or any other data described herein using data fusion techniques. In an embodiment, data fusion techniques such as sensor fusion or multi-modal data fusion may be employed, by processor 104, wherein data from various sources may be combined to into a master representation which configured to provide a more comprehensive and accurate representation of the logistics scenario across different systems, models, and/or processing steps described herein. In a non-limiting example, processor 104 may implement Kalman filtering or Bayesian networks to integrate data based on measured respective degrees of uncertainties and correlations. In another non-limiting example, processor 104 may be configured to join one or more data structures. Tables in logistic databases 128 as described above based on pre-defined relations such as common keys (e.g., primary, and foreign keys); for instance, and without limitation, order data 116 and transportation data 120 may be joined, by processor 104, on a shipment identifier using join operations.

With continued reference to FIG. 1, in some cases, integrated logistics data collection 112 may be associated with a plurality of temporal elements 132. As used in this disclosure, "temporal elements" refers to time-related attributes, markers, or otherwise indicators associated with plurality of data points or datasets. In some cases, plurality of temporal elements 132 may provide a chronological context to integrated logistic data collection 112; for instance, and without limitation, plurality of temporal elements 132 may help processor 104 in processing and identifying a sequence of events, the duration between events, or exact moments an event took place in integrated logistic data collection 112. In an embodiment, data streams from external sources described herein may be accepted by processor 104 in real-time or at defined intervals ensuring timely updates and accurate reflections of the current logistics scenario.

Still referring to FIG. 1, in a non-limiting embodiment, each temporal element of plurality of temporal elements 132 may include a timestamp, wherein the timestamp may indicate when corresponding data was recorded or when an event occurred. In a non-limiting example, integrated logistic data collection 112 may include order data 116 received from a supply chain management system, wherein the supply chain management system may record the exact time an order was placed. In some cases, each data point or dataset within integrated logistic data collection 112 may be associated with a plurality of temporal elements; for instance, and without limitation, integrated logistic data collection 112 may include a transportation schedule containing at least two temporal elements, wherein the at least two temporal elements (e.g., duration) may include a departure time and an (estimated) arrival time. Additionally, or alternatively, plurality of temporal elements 132 may include one or more sequences such as, without limitations, cargo loading sequences, delivery sequences, maintenance check sequences, among others.

With continued reference to FIG. 1, receiving logistic data collection 112 may include aligning plurality of datasets e.g., order data 116, transportation data 120, environmental data 124 based on plurality of temporal elements 132. In an embodiment, processor 104 may be configured to generate a chronological view of logistics options against one or more data points or datasets such as, without limitation, environmental conditions (e.g., environmental data 124), upon receipt of integrated logistic data collection 112. In a non-limiting example, a time-series analysis may be applied to track a progression or a correlation of order deliveries with environmental conditions (or any other factors related to order or transportation of the ordered items or products) by processor 104, wherein processor 104 may perform any processing steps described below on resulting progression or correlation. Such chronological view may be visualized in the form of graphs, charts, or timelines by processor 104 as described in detail below, providing stakeholders with a comprehensive understanding of logistics operations in relation to time.

With continued reference to FIG. 1, processor 104 is configured to determine at least one projected carbon emission 136 as a function of integrated logistics data collection 112. As used in this disclosure, "projected carbon emission" is an estimated amount of greenhouse gases such as, without limitation, carbon dioxide (CO2) that are expected to be released as a result of specific logistics activities. In an embodiment, at least one projected carbon emission 136 may be represented as a numerical value. In some cases, at least one projected carbon emission 136 may be measured in metric tons or kilograms of CO2 equivalent. In a non-limiting example, projected carbon emission may include information estimating that delivery or transport of a cargo may cause 7.5 kilograms of carbon to be emitted based on data available in integrated logistics data collection 112. In another embodiment, at least one projected carbon emission 136 may include a range of estimations. For example, at least one projected carbon emission 136 may include an estimation such as 6.5-7.2 kilograms of carbon emitted.

In one or more embodiments, and still referring to FIG. 1, at least one projected carbon emission 136 may include pollutants and/or an aggregation of calculated pollutants that will be emitted as a function of integrated logistic data collection 112. In some cases, at least one projected carbon emission 136 may include one or more data points describing pollutants that will be emitted as a function of the transportation specified by transportation data 120 such as, but not limited to carbon dioxide, particular matter, nitrous oxides, sulfur, hydrocarbons, carbon monoxide and the like. Additionally, or alternatively, at least one projected carbon emission 136 may be represented as a weighted sum of individual pollutants described herein, wherein each pollutant may be assigned a weight based on its environmental impact or regulatory importance. In a non-limiting example, CO2 may be given a relatively higher weight compared to other greenhouse gases due to its observable impact on global warming, while particulate matter may be weighted based on its effects on air quality and human health.

With continued reference to FIG. 1, in some cases, determining at least one projected carbon emission 136 may include identifying an emission factor associated with integrated logistic data collection 112. As used in this disclosure, an "emission factor" refers to a representative value that attempts to relate the quantity of a pollutant as described herein release to the atmosphere with certain data points (e.g., events) associated with the release of the pollutant. In an embodiment, emission factor may include an expression of weight of pollutant ($w_p$) divided by a unit weight, volume, distance, duration, and/or the like of a particular activity emitting the pollutant, for example, and without limitation, kilograms of CO2 emitted per gallon of gasoline consumed. In a non-limiting example, emission factor may be associated with one or more data points or datasets such as item/product type, transportation mode, fuel type, or even operational practices directly or indirectly specified in integrated logistic data collection 112. In some cases, processor 104 may retrieve pre-existing emission factors from logistic database 128 or any other public databases affiliated with environmental agencies or international organizations and contain emission factors for a wide range of activities and conditions.

With continued reference to FIG. 1, in an embodiment, at least one projected carbon emission 136 may be calculated as a function of order data 116, transportation data 120, environmental data 124, and/or any combination thereof. In some embodiments, determining at least one projected carbon emission 136 may include calculating projected carbon emission based on order data 116; for instance, and without limitation, integrated logistic data collection 112 may include a dataset describing a plurality types of good, wherein each type of good may have an associated carbon emission factor which represents an average amount of carbon emitted per unit of such good when transported over a standard distance. In a non-limiting example, transporting perishable goods such as fruits may have different carbon emission factor compared to non-perishable items such as electronics due to the need for refrigeration or specific storage conditions. In some cases, without limitation, following formula may be used by processor 104 to calculate at least one projected carbon emission based on order data 116:

$$E_{projected} = \sum_{i=1}^{n}(Q_i \times EF_i \times d_i)$$

Wherein n is total number of different goods in a given order; $Q_i$ represent a quantity of $i^{th}$ good; $EF_i$ indicates a carbon emission factor associated with the $i^{th}$ good; and da is a distance over which $i^{th}$ good is to be transported (in some cases, $d_i$ may be specified in transportation data 124).

With continued reference to FIG. 1, in another embodiment, at least one projected carbon emission 136 may be calculated as a function of transportation data 120. As described above, transportation data 120 may include data points related to transportation modes, route, duration, and/or frequency of transportation activities. In some cases, mode of transportation may include, without limitation, transport by road, air, sea, rail, and/or the like. In a non-limiting example, projected carbon emissions 136 may include an aggregation of carbon emissions of one or more transport vehicles that are used to transport goods. In another non-limiting example, at least one projected carbon emission 136 may include emissions for each transport route, for each vehicle and the like. In some cases, transport route may include a segment of an overall route that is traversed by one or more vehicle that are used to transport goods. For instance, and without limitation, transportation data 120 of integrated logistic data collection 112 may include specification of multiple transport routes containing a first transport route from an origin location to a first stop and a second transport route from the first stop to a destination. In some cases, transport routes may affect the determination of at least one projected carbon emissions. In a non-limiting example, vehicle that are sitting idle in traffic due to construction may affect the overall carbon emissions that are emitted as a result of the construction. Similarly, a stretch of road with a given incline may affect carbon emissions in contrast to a stretch of road having a decline.

Still referring to FIG. 1, in one or more embodiments, at least one projected carbon emission may be determined as a function of one or more selected transportation vehicles. In a non-limiting example, transportation data 120 may indicate a selection of a transportation vehicle that operates on green energy such as electric truck or solar-powered ship, may result in a relative lower projected carbon emission compared to vehicles relying on fossil fuels. In some embodiments, each mode of transportation corresponds to one or more transportation vehicles may be associated with a distinct carbon emission profile, which may be quantified based on standardized emission factors. For instance, and without limitation, the emission profile for a diesel-powered truck may be different from that of an electric truck. Similarly, the emissions from a cargo ship may be higher per miles than those from a freight train. In a non-limiting example, determining at least one projected carbon emission 136 may include comparing different carbon emission profile of each transportation mode. For instance, transporting goods by truck may differ from those of transporting the same goods by air or sea due to differences in fuel efficiency, travel distance, vehicle capacity, and/or the like. In some cases, processor 104 may be configured to calculate at least one projected carbon emission according to the following equation:

$$E_{projected} = \sum_{j=1}^{m}(d_i \times EF(mode_j))$$

Wherein m is the total number of transportation mode used; $d_j$ is the distance traveled using the $j^{th}$ mode of transportation; and $EF(mode_j)$ is the carbon emission factor associated with the $j^{th}$ mode of transportation. In some cases, such emission factor may be derived or received from the carbon emission profile associated with the $j^{th}$ mode of transportation described in integrated logistic data collection 112.

Still reference to FIG. 1, in further embodiments, other exemplary data points in transportation data 120 such as, without limitation, fuel type as well as fuel consumption may be considered, by processor 104, during determination of at least one projected carbon emission 136. In an embodiment, logistic database 128 may include at least a table (as illustrated below) containing a plurality of emission factors corresponding to various fuel types:

| FUEL TYPE | EMISSION FACTOR (KG/L) |
|---|---|
| DIESEL | 2.68 |
| GASOLINE | 2.31 |
| BIODISEAL (B20) | 2.16 |
| ETHANOL (E10) | 2.24 |
| NATURAL GAS | 2.75 |
| PROPANE | 1.51 |

It should be noted that other unit of measurement may be used for emission factors (e.g., kg $CO_2$/MJ, kg $CO_2$/kWh, kg $CO_2$/Btu, kg $CO_2$/gallon, kg $CO_2$/m$^3$), and other fuel types may be considered in the determination of projected carbon emission such as, without limitation, hydrogen, methanol, compressed air, electric (from renewable sources), synthetic fuels, blends of various biofuels, among others. For instance, and without limitation, diesel may have a different emission factor compared to gasoline or biofuel. In another embodiment, processor 104 may account for the efficiency of the transportation vehicle, where newer models or vehicles with advanced engines may consume fuel more efficiently, leading to a reduced projected carbon emission 136.

In a non-limiting example, and still referring to FIG. 1, one liter of gasoline, when used as a fuel, produces 2.32 kg (about 1300 liters or 1.3 cubic meters) of carbon dioxide, a greenhouse gas. One US gallon produces 19.4 lb. (1,291.5 gallons or 172.65 cubic feet). At least one projected carbon emission factor 136 may also be determined, by processor 104, as a function of energy generated from the fuel. The mass of carbon dioxide that is released when one MJ of energy is released from fuel can be estimated to a good approximation. Note that diesel (i.e., approximation $C_nH_{2n}$) is a mixture of different molecules. As carbon has a molar mass of 12 g/mol and hydrogen has a molar mass of about 1 g/mol, so the fraction by weight of carbon in diesel is roughly 12/14. The reaction of diesel combustion is given by:

$$2C_nH_{2n} + 3nO_2 \rightleftharpoons 2nCO_2 + 2nH_2O$$

$CO_2$ has a molar mass of 44 g/mol as it consists of 2 atoms of oxygen (16 g/mol) and 1 atom of carbon (12 g/mol). So, 12 g of carbon yield 44 g of $CO_2$. Diesel has an energy content of 42.6 MJ per kg, or 23.47 gram of Diesel contain 1 MJ of energy, therefore:

$$23.47 \text{ g}\frac{\text{Diesel}}{\text{MJ}} * \frac{12}{14} * \frac{44}{12} = 74 \text{ g (Carbon Dioxide)/MJ}$$

However, for gasoline, with 22 g/MJ and a ratio of carbon to hydrogen atoms of about 6 to 14, the estimated value of carbon emissions for 1 MJ of energy is:

$$22 \text{ g} \frac{\text{gasoline}}{\text{MJ}} * \frac{6*12}{6*12+14*1} * \frac{44}{12} = 67.5 \text{ g (Carbon Dioxide)/MJ}$$

With continued reference to FIG. 1, in a further embodiment, processor 104 may be configured to determine at least one projected carbon emission 136 as a function of environmental data 124. In some cases, certain environmental conditions may affect the efficiency of combustion engines, leading to variations in carbon emissions. In a non-limiting example, environmental data 124 described herein may include data points describing ambient temperature, humidity, wind speed, wind direction, atmospheric pressure, weather, air condition, and/or the like. In some cases, a colder ambient temperature may require more fuel to be burned to achieve the same power output leading to higher emissions. Similarly, higher humidity level may affect the combustion process in engines, potentially leading to incomplete combustion and increased emissions of certain pollutants. In a non-limiting example, processor 104 may calculate at least one projected carbon emission 136 based on the following equation:

$$E_{projected} = f(T, H, W, P)$$

Wherein T is the ambient temperature; H is the humidity level; W is the wind speed; and P is the atmospheric pressure. Function $f$ represents a mathematical model that relates theses environmental factors to carbon emissions. In some cases, this model may be derived from integrated logistic data collection via one or more statistical techniques. In a non-limiting example, if a fleet of trucks is operating in an area experiencing unusually cold temperatures, at least one projected carbon emission 136 may be adjusted upwards to account for the expected increase in fuel consumption. Conversely, if the same fleet operates in a region with a favorable wind conditions that assist in propulsion, at least one projected carbon emissions may be adjusted downwards.

In one or more embodiments, and still referring to FIG. 1, determining the at least one projected carbon emission 136 may include transforming integrated logistics data collection 112 into a logistic vector space by generating a plurality of logistics vectors based on integrated logistics data collection 112. As used in this disclosure, a "logistic vector space" refers to a multi-dimensional space where each dimension represents a specific attribute or feature of integrated logistics data collection 112. In an embodiment, data points in logistics vector space may be represented as plurality of vectors as described above, termed "logistics vectors." In some cases, generating plurality of logistics vector may include capturing one or more relationships of original data within integrated logistics data collection 112 in a format that is more amenable to further processing steps described herein, including, without limitation, training one or more machine learning models as described in detail below. In a non-limiting example, transforming integrated logistics data collection 112 may include mapping each data point or dataset to a vector such that similar data points or datasets are closed to each other in logistic vector space, while dissimilar ones may be farther apart.

Still referring to FIG. 1, to transform integrated logistics data collection 112 into logistic vector space, various vector embedding techniques may be employed, by processor 104. As used in this disclosure, "vector embedding techniques" are algorithms or methods that convert raw data into vectors in a way that preserves the inherent relationships and structures in the data. Exemplary vector embedding techniques may include, without limitation, Word2Vec, Doc2Vec, FastText, Principal Component Analysis (PCA), and/or the like; for instance, and without limitation, Word2Vec may be adapted to represent logistics data by treating each data point or datasets within integrated logistics data collection 112 as a semantic unit e.g., a "word" and the entire integrated logistics data collection 112 as a "document." In a non-limiting example, if integrated logistics data collection includes transportation data such as routes, vehicle types, and schedules, wherein each route or vehicle type may be treated as a word or a set of words. Using Word2Vec, each of these "words" may be embedded into logistic vector space, resulting in vectors that capture the relationships between different routes or vehicle types based on their co-occurrence in integrated logistics data collection 112. Similarly, PCA may be used to reduce the dimensionality of the logistic vector space while preserving a desired variance, resulting in a set of principal vectors that represent the main patterns in integrated logistics data collection 112. Once integrated logistics data collection is transformed into logistic vector space, further processing steps, such as, without limitation, clustering or classification may be performed on plurality of logistics vectors to derive insights or making predictions about carbon emissions as described herein.

With continued reference to FIG. 1, processor 104 may be configured to determine a vector distance in logistic vector space between each logistics vector of the plurality of logistics vectors. As used in this disclosure, a "vector distance" is a measure of dissimilarity or similarity between two (logistics) vectors described herein. In an embodiment, plurality of logistics vectors as described herein may be scaled, such that each logistic vector of plurality of logistics vectors may represent each attribute along an equivalent scale of values. Determining vector distance in logistic vector space may include computing a degree of vector similarity between each logistics vector of plurality of vectors. In some cases, vector similarity may be measured according to any norm for proximity and/or similarity of two vectors, including without limitation cosine similarity. As used in this disclosure "cosine similarity" is a measure of similarity between two-non-zero vectors of a vector space, wherein determining the similarity includes determining the cosine of the angle between the two vectors. Cosine similarity may be computed as a function of using a dot product of the two vectors divided by the lengths of the two vectors, or the dot product of two normalized vectors. For instance, and without limitation, a cosine of 0° is 1, wherein it is less than 1 for any angle in the interval (0,π) radians. Cosine similarity may be a judgment of orientation and not magnitude, wherein two vectors with the same orientation have a cosine similarity of 1, two vectors oriented at 90° relative to each other have a similarity of 0, and two vectors diametrically opposed have a similarity of −1, independent of their magnitude. As a non-limiting example, vectors may be considered similar if parallel to one another. As a further non-limiting example, vectors may be considered dissimilar if orthogonal to one another. As a further non-limiting example, vectors may be considered uncorrelated if opposite to one another. In other embodiments, vector distance May also include, without limitation, Euclidean distance, Manhattan distance, Mahalanobis distance, among others.

Still referring to FIG. 1, in some cases, dimensions of logistic vector space may not represent distinct data within integrated logistics data collection 112, in which case elements of a vector representing a first transportation data may have numerical values that together represent a geometrical relationship to a vector representing a second transportation data, wherein the geometrical relationship represents and/or approximates a relationship between the first transportation data and the second transportation data. For instance, and without limitation, an angle between two logistics vectors may capture the correlation between two transportation datasets they represent. In a non-limiting example, if the cosine similarity between two logistics vectors is close to 1, it may indicate that two corresponding transportation datasets have very similar logistics patterns or attributes. On the other hand, a cosine similarity close to −1 may suggest that two corresponding transportation datasets are diametrically opposite in one or more logistics aspects described herein. For instance, and without limitation, one transportation dataset may represent a first transportation route that prioritize speed and directness, and heavily reliant on fossil fuels, resulting in higher projected carbon emission, while the other dataset may represent a second transportation route that prioritizes eco-friendly paths, and uses renewable energy sources, resulting in reduced projected carbon emission.

With continued reference to FIG. 1, processor 104 may also employ one or more feature learning algorithms to further refine the logistics vectors within logistics vector space. A "feature learning algorithm," as used herein, is a machine-learning algorithm that identifies associations between elements of data in a data set, which may include without limitation a training data set, where particular outputs and/or inputs are not specified. As a non-limiting example, the feature learning algorithm may detect co-occurrences of transportation modes with specific environmental conditions or routes. Processor 104 may perform a feature learning algorithm by dividing order data 116, transportation data 120, environmental data 124 from integrated logistics data collection 112 into various sub-combinations of such data to create feature sets and evaluate which feature sets tend to co-occur with which other feature sets. For instance, and without limitation, the algorithm may identify that certain transportation modes, like maritime routes, often co-occur with specific environmental conditions, such as calm seas or favorable wind patterns, leading to more efficient and eco-friendly transportation. Such features sets may then be used by processor 104 to optimize transportation plans as described in detail below.

With continued reference to FIG. 1, processor 104 may use a machine learning module to implement one or more algorithms or generate one or more machine learning models, such as a carbon emission projection model 140 to determine at least one projected carbon emission 136. However, the machine learning module is exemplary and may not be necessary to generate one or more machine learning models and perform any machine learning described herein. In one or more embodiments, one or more machine-learning models may be generated using training data. Training data may include inputs and corresponding predetermined outputs so that a machine-learning model may use correlations between the provided exemplary inputs and outputs to develop an algorithm and/or relationship that then allows machine-learning model to determine its own outputs for inputs. Training data may contain correlations that a machine-learning process may use to model relationships between two or more categories of data elements. Exemplary inputs and outputs may come from a database, such as logistic database 128 or any other databases described herein or be provided by a user. In other embodiments, a machine-learning module may obtain a training set by querying a communicatively connected database that includes past inputs and outputs. Training data may include inputs from various types of databases, resources, and/or user inputs and outputs correlated to each of those inputs so that a machine-learning model may determine an output. Correlations may indicate causative and/or predictive links between data, which may be modeled as relationships, such as mathematical relationships, by machine-learning models, as described in further detail below. In one or more embodiments, training data may be formatted and/or organized by categories of data elements by, for example, associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements. In a further embodiment, training data may include previous outputs such that one or more machine learning models iteratively produces outputs.

With continued reference to FIG. 1, determining at least one projected carbon emission 136 may include receiving carbon emission training data, wherein the carbon emission training data may include a plurality of logistics datasets as input correlated to a plurality of historical carbon emissions as output. As used in this disclosure, "historical carbon emission" refers to the recorded carbon emissions due to historical integrated logistics data collections e.g., data related to logistics events/activities in the past. In some cases, historical carbon emissions may be derived from various data sources, such as logistics database 128 described herein or external emission monitoring systems, public governmental databases, or third-party environmental agencies. In a non-limiting example, historical carbon emissions may include data points that detail the emissions produced by specific transportation modes, routes, or even individual vehicles over a given period defined by one or more previous temporal elements. In an embodiment, each logistics dataset correlated to each historical carbon emission may include any data within integrated logistics data collection 112 as described herein such as, without limitation, fuel type used, distance traveled, load carried, specific environmental conditions during transportation, and/o the like. In such embodiment, each logistics dataset may serve as a comprehensive snapshot of the logistics activity that led to a specific carbon emission output. Additionally, or alternatively, logistics datasets and/or historical carbon emissions within carbon emission training data may be adjusted or normalized to account for changes in user input, measurement techniques, regulatory standards, or to remove outliers that could skew the training process described herein.

Still referring to FIG. 1, processor 104 may then be configured to train carbon emission projection model 140 using received carbon emission training data. Training process may involve feeding carbon emission projection model 140 with a plurality of logistics datasets and a plurality of corresponding historical carbon emissions as described above. In one or more embodiments, training carbon emission projection model 140 may include minimizing a loss function, wherein the "loss function," for the purpose of this disclosure, is an optimization algorithm used to evaluate how well the model's predictions align with the actual outcomes. In some cases, loss function may quantify a difference between the predicted and actual carbon emissions, aiming to steer carbon emission projection model 140 in a desired direction during an iterative training process. In a non-limiting example, mean squared error (MSE) may be used as a loss function to calculate an average squared difference between at least one projected carbon emission 136 and historical carbon emission. In some embodiments, selection of different loss functions may influence carbon emission projection model's 140 sensitivity to certain types of errors; for instance, and without limitation, while MSE may penalize larger errors more heavily, a mean absolute error (MAE) loss function may treat all errors equally, regardless of the magnitude of the errors. Once trained, carbon emission projection model 140 may then be used, by processor 104, to determine at least one projected carbon emission 136 as a function of integrated logistics data collection 112.

With continued reference to FIG. 1, processor 104 is configured to generate at least one transportation plan 144 as a function of integrated logistic data collection 112 and at least one projected carbon emission 136. As used in this disclosure, a "transportation plan" refers to a strategic blueprint that outlines methods, routes, and/or resources to be utilized for the movement of goods. Generating the at least one transportation plan 144 may adhere to at least one projected carbon emission constraints. In some cases, at least one transportation plan may include, without limitation, one or more selections of transportation modes, desired transportation routes, scheduling, load distribution, and/or the like. In a non-limiting example, a large e-commerce company that needs to deliver thousands of packages daily across a metropolitan area. Processor 104 may, based on projected carbon emissions 136 determined as a function of integrated logistics data collection 112 pertaining the e-commerce company, generate a transportation plan 144 may suggest using electric delivery vans for urban areas to reduce carbon emission, while for longer routes, where electric vehicles my not be feasible due to charging infrastructure limitations, hybrid trucks may be recommended. Additionally, or alternatively, at least one transportation plan 144 may also prioritize deliveries based on the density of orders (i.e., order data 116) in a particular area; for instance, and without limitation, processor 104 may generate at least one transportation plan 144 suggesting that deliveries to areas with a higher concentration of orders be made first to optimize the transportation routes and reduce the total distance traveled.

Still referring to FIG. 1, in some cases, at least one transportation plan 144 may be formulated, by processor 104, through analyzing historical data (e.g., historical carbon emissions), current conditions (e.g., weather patterns, traffic congestion, fuel availability and the like), and predictive models (e.g., future demand forecasts, anticipated environmental changes, and the like). In some cases, processor 104 may be configured to generate at least one transportation plan having a prioritized transportation routes or transportation modes that have historically demonstrated lower carbon emissions, as inferred from carbon emission projection model 140. In a non-limiting example, if past logistics datasets and carbon emissions indicates that a certain maritime routes has consistently resulted in lower emissions due to factors such as, efficient shipping practices or favorable sea currents, wind speed and directions, that route may be given precedence in at least one transportation plan 144 generated by processor 104. Additionally, or alternatively, processor 104 may prioritize transportation modes that utilize renewable energy sources. In a non-limiting example, a fleet of trucks that run on biofuels or electric vans powered by solar energy may be preferred over conventional diesel trucks.

In one or more embodiments, and still referring to FIG. 1, machine learning module may generate and train one or more machine learning models such as, without limitation, transportation plan generation model using transportation plan training data, wherein the transportation plan training data may include plurality of logistics datasets as input correlated to a plurality of transportation plans as output. Each logistics dataset may indicate one or more transportation plans suitable for specific order details, logistical requirements, environmental conditions, and/or the like. In a non-limiting example, a logistics datasets indicating a large volume of goods and a tight delivery schedules may correlate to a transportation plan that prioritizes rail transport over road transport. Generating at least one transportation plan 144 may include generating at least one transportation plan 144 using trained transportation plan generation model as a function of integrated logistics data collection 112. In a case where more than one transportation plans are generated, processor 104 may be configured to select at least one transportation plan 144 from multiple transportation plans based on one or more criterion such as minimizing projected carbon emission, optimizing delivery times, or balancing between the two. In a non-limiting example, if a first and a second transportation plans offer similar delivery times, but the first transportation plan has a significantly lower projected carbon emission, processor 104 may prioritize first transportation plan over the second transportation plan. Conversely, if faster delivery time weight more, processor 104 may opt for a transportation plan that includes transportation vehicles having highest speed event if it may have a slightly higher projected carbon emission.

With continued reference to FIG. 1, in one or more embodiments, processor 104 may implement one or more aspects of "generative artificial intelligence (AI)," a type of AI that uses machine learning algorithms to create, establish, or otherwise generate data such as, without limitation, transportation data 144 that is similar to one or more provided sets of training data. In an embodiment, machine learning module described herein may generate one or more generative machine learning models that are trained on one or more set of examples e.g., example transportation plans. One or more generative machine learning models may be configured to generate new examples that are similar to the training data of the one or more generative machine learning models but are not exact replicas; for instance, and without limitation, data quality or attributes of the generated examples may bear a resemblance to the training data provided to one or more generative machine learning models, wherein the resemblance may pertain to underlying patterns, features, or structures found within the provided training data.

Still referring to FIG. 1, in some cases, generative machine learning models may include one or more generative models. As described herein, "generative models" refers to statistical models of the joint probability distribution P(X, Y) on a given observable variable x, representing features or data that can be directly measured or observed (e.g., order data 116, transportation data 120, environmental data 124) and target variable y, representing the outcomes or labels that one or more generative models aims to predict or generate (e.g., transportation plan including one or more parameters/configurations such as transportation modes, routes, schedules, and any other logistical decisions). In some cases, generative models may rely on Bayes theorem to find joint probability; for instance, and without limitation, Naïve Bayes classifiers may be employed by processor 104 to categorize input data such as, without limitation, integrated logistics data collection 112 into different classes such as, without limitation, "urgent," "standard," "flexible," and/or the like as described in detail below.

In a non-limiting example, and still referring to FIG. 1, one or more generative machine learning models may include one or more Naïve Bayes classifiers, generated by processor 104, using a Naïve bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as P(A/B)=P(B/A) P(A)=P(B), where P(A/B) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. processor 104 may then calculate a likelihood table by calculating probabilities of different data entries and classification labels. Processor 104 may utilize a naïve Bayes equation to calculate a posterior probability for each class. A class containing the highest posterior probability is the outcome of prediction.

Still referring to FIG. 1, although Naïve Bayes classifier may be primarily known as a probabilistic classification algorithm; however, it may also be considered a generative model described herein due to its capability of modeling the joint probability distribution P(X, Y) over observable variables X and target variable Y. In an embodiment, Naïve Bayes classifier may be configured to make an assumption that the features X are conditionally independent given class label Y, allowing generative model to estimate the joint distribution as P(X, Y)=P(Y)ΠiP(Xi|Y), wherein P(Y) may be the prior probability of the class, and P(X$_i$|Y) is the conditional probability of each feature given the class. One or more generative machine learning models containing Naïve Bayes classifiers may be trained on labeled training data, estimating conditional probabilities P(X$_i$|Y) and prior probabilities P(Y) for each class; for instance, and without limitation, using techniques such as Maximum Likelihood Estimation (MLE). One or more generative machine learning models containing Naïve Bayes classifiers may select a class label y according to prior distribution P(Y), and for each feature X$_i$, sample at least a value according to conditional distribution P(X$_i$|y). Sampled feature values may then be combined to form one or more new data instance with selected class label y. In a non-limiting example, one or more generative machine learning models may include one or more Naïve Bayes classifiers to generate new examples of transportation plan based on transportation needs (e.g., urgent, standard, of flexible) or transportation modes (e.g., low-emission, medium-emission, or high-emission), wherein the models may be trained using historical transportation plans, environmental conditions, order data, and other relevant logistics datasets described herein.

Still referring to FIG. 1, in some cases, one or more generative machine learning models may include generative adversarial network (GAN). As used in this disclosure, a "generative adversarial network" is a type of artificial neural network with at least two sub models (e.g., neural networks), a generator, and a discriminator, that compete against each other in a process that ultimately results in the generator learning to generate new data samples, wherein the "generator" is a component of the GAN that learns to create hypothetical data by incorporating feedback from the "discriminator" configured to distinguish real data from the hypothetical data. In some cases, generator may learn to make discriminator classify its output as real. In an embodiment, discriminator may include a supervised machine learning model while generator may include an unsupervised machine learning model as described in further detail with reference to FIG. 2.

With continued reference to FIG. 1, in an embodiment, discriminator may include one or more discriminative models, i.e., models of conditional probability P(Y|X=x) of target variable Y, given observed variable X. In an embodiment, discriminative models may learn boundaries between classes or labels in given training data. In a non-limiting example, discriminator may include one or more classifiers as described in detail below to distinguish between different categories e.g., correct vs. incorrect, or states e.g., TRUE vs. FALSE within the context of generated data such as, without limitations, transportation plan described herein. In some cases, processor 104 may implement one or more classification algorithms such as, without limitation, Support Vector Machines (SVM), Logistic Regression, Decision Trees, and/or the like to define decision boundaries.

In a non-limiting example, and still referring to FIG. 1, generator of GAN may be responsible for creating synthetic data that resembles a valid transportation plan. In some cases, GAN may be configured to receive integrated logistic data collection or at least a portion thereof such as, without limitation, order data 116, transportation data 120, environmental data 124, or any combination thereof, as input and generates potential transportation plans. On the other hand, discriminator of GAN may evaluate the authenticity of the generated content by comparing it to historical transportation plans, for example, discriminator may distinguish between genuine and generated content and providing feedback to generator to improve the model performance.

With continued reference to FIG. 1, in other embodiments, one or more generative models may also include a variational autoencoder (VAE). As used in this disclosure, a "variational autoencoder" is an autoencoder (i.e., an artificial neural network architecture) whose encoding distribution is regularized during the model training process in order to ensure that its latent space includes desired properties allowing new data sample generation. In an embodiment, VAE may include a prior and noise distribution respectively, trained using expectation-maximization meta-algorithms such as, without limitation, probabilistic PCA, sparse coding, among others. In a non-limiting example, VEA may use a neural network as an amortized approach to jointly optimize across input data and output a plurality of parameters for corresponding variational distribution as it maps from a known input space to a low-dimensional latent space. Additionally, or alternatively, VAE may include a second neural network, for example, and without limitation, a decoder, wherein the "decoder" is configured to map from the latent space to the input space.

In a non-limiting example, and still referring to FIG. 1, VAE may be used by processor 104 to model complex relationships between plurality of logistics vectors. In some cases, VAE may encode input data into a latent space, capturing essential properties of integrated logistics data collection 112. Such encoding process may include learning one or more probabilistic mappings from observed user action data to a lower-dimensional latent representation. Latent representation may then be decoded back into the original data space, therefore reconstructing the observed user actions. In some cases, such decoding process may allow VAE to generate new examples or variations that are consistent with the learned distributions.

With continued reference to FIG. 1, one or more generative machine learning models may utilize one or more predefined templates representing, for example, and without limitation, standard transportation routes, common transportation modes, historical transportation patterns, optimal load distributions, and/or the like. In a non-limiting example, one or more transportation plan templates may outline a standard route for shipping goods from a warehouse in City A to retail outlet in City B using road transportation, such transportation plan templates may detail preferred highway routes, rest stops, refueling points, and event time-of-day recommendations for avoiding traffic. In some cases, transportation plan templates may serve as benchmarks for comparing and evaluating the efficiency, cost-effectiveness, and carbon emission implication or alternative routes or modes proposed by one or more generative machine learning models.

Additionally, or alternatively, and still referring to FIG. 1, in case of multi-modal transportation, a transportation template may detail a sequence of using road, rail, air, and/or sea transport for shipping goods from one continent to another, providing a starting point that ensures seamless transitions, minimal delays, and optimal carbon emissions. In an embodiment, when one or more generative machine learning models generate a transportation plan, processor 104 may be configured to use transportation plan template to ensure that the generated transportation plan meets or exceeds the standard encapsulated in the template. Further, transportation plan templates may be dynamically updated based on new data, insights, or changing conditions as described in detail below. In a non-limiting example, if a particular highway route in the transportation template becomes frequently congested due to construction or increased traffic, processor 104 may be configured to update transportation template to generate new transportation plans that avoid such congested route.

Still referring to FIG. 1, processor 104 may configure generative machine learning models to analyze the patterns and relationships within integrated logistics data collection 112, thereby allowing processor 104 to identify any anomalies, discrepancies, or deviations from expected transportation plans or carbon emission projections. In some cases, processor 104 may be configured to pinpoint specific errors in the transportation routes, scheduling, or load distribution based on the historical and current data. In a non-limiting example, processor 104 may be configured to implement generative machine learning models to incorporate additional models to detect inconsistencies in the carbon emission data. In some cases, errors may be classified into different categories such as data entry errors, sensor malfunctions, or anomalies due to unexpected events. In a non-limiting example, if a truck's reported emissions suddenly double without a corresponding increase in its load or travel distance, processor 104, using a generative machine learning model such as, without limitation, a Generative Adversarial Network (GAN), may be configured to generate a hypothesis or simulation to explain such discrepancy. In some embodiments, processor 104 may be configured to flag or highlight these discrepancies, altering user or other entities through user interface as described in detail below using one or more generative machine learning models. In other embodiments, one or more generative machine learning models may be configured to generate and output indicators such as, without limitation, color-coded alerts, graphical representations, or predictive charts, providing a visual cue to the users and/or other entities about potential issues or areas of concern in the logistics and carbon emission data.

With continued reference to FIG. 1, processor 104 is configured to continuously receive a current logistics datum 148 from an external source 152. As used in this disclosure, a "current logistics datum" refers to a real-time or near-real-time data related to logistics operations. In some cases, current logistics datum 148 may include, without limitation, current vehicle locations, traffic conditions, weather updates, shipment statuses, vehicle capacities, fuel consumption rates, and other relevant parameters that are time sensitive. In an embodiment, continuous reception of current logistics datum 148 may ensure that the system remains updated with real-time information, enabling processor 104 to perform subsequent processing steps. In some cases, external source 152 may include any system, device, or platform that provides relevant logistics data. Exemplary external source 152 may include, without limitation, GPS tracking systems, weather forecasting services, traffic monitoring platforms, IoT sensors placed at key logistics points, and even direct inputs from logistics personnel or automated systems. In a non-limiting example, current logistics datum 148 may include real carbon data, wherein the "real carbon data," for the purpose of this disclosure, is data relating to the actual emissions of CO2 associated with transportation of goods determined or calculated at transportation in real-time.

Still referring to FIG. 1, in some embodiments, the current logistics datum may be detected by one or more sensors (i.e., external sources). A "sensor," for the purposes of this disclosure, is a device that is configured to detect an input and/or a phenomenon and transmit information related to the detection. In some embodiments, sensors may be communicatively connected to processor 104. In some embodiments, a sensor may transduce a detected phenomenon and/or characteristic, such as without limitation, temperature, voltage, pressure, and the like, into a sensed signal. In some embodiments, the sensor may include a plurality of sensors. The sensor may be a contact or a non-contact sensor. In some embodiments, the sensor may be an encoder. An "encoder," for the purposes of this disclosure, is a sensing device that converts an angular motion or position into analog or digital output signals. Encoders may convert motion to an electrical signal that can be read by some type of control device in a motion control system, such as a counter or PLC. The encoder may send feedback signal that can be used to determine position, count, speed, direction, and the like. In some cases, processor 104 may use this information to send a command for a particular function.

In one or more embodiments, and still referring to FIG. 1, sensor may include one or more carbon sensors. "Carbon sensor" for the purposes of this disclosure is a sensor configured to detect carbon emissions. For example, sensor may include a nondispersive infrared (NDIR) $CO_2$ sensor. The current logistic datum, in some embodiments, may be detected by carbon sensors such as, but not limited to, nondispersive infrared (NDIR) $CO_2$ sensors. The NDIR $CO_2$ sensor may include an infrared (IR) lamp, an optical filter, and a detector. The IF detector may read remaining amount of light from the IR lamp that was not absorbed by $CO_2$ molecules, which absorbs 4.26-micron absorption band, or the optical filter. In one or more embodiments, each transport vehicle may contain one or more sensors wherein the sensors may be configured to receive real carbon data as described above.

In one or more embodiments, and still referring to FIG. 1, carbon sensors may include fuel sensors configured to measure a difference in fuel within a fuel storage of transport vehicle. In one or more embodiments fuel sensors may detect a difference in fuel within fuel storage wherein a certain amount of fuel used may be attributed to a certain amount of carbon emitted. Fuel sensors may include but are not limited to, optical fuel level sensors, pressure, based sensors, weight-based sensors, voltage sensors, capacitance sensors, and/or any other sensor that may be used to determine a change in fuel.

With continued reference to FIG. 1, in other embodiments, current logistics datum 148 may include one or more user inputs. In some cases, users may include logistics managers, warehouse operators, vehicle drivers, supply chain analysts, and the like. In some cases, user inputs may include, without limitation, manual updates on shipment statuses, feedback on route conditions, real-time inventory levels, vehicle maintenance reports, emergency alerts, and/or the like. In a non-limiting example, processor 104 may be communicatively connected with a user device, wherein the "user device," for the purpose of this disclosure, is any electronic device affiliated with the user capable of transmitting and receiving data. Exemplary user devices may include, without limitation, smartphones, tablets, laptops, desktops, smart wearable devices, and/or the like. In a non-limiting example, a vehicle driver may use a smartphone to report a sudden breakdown or delay due to unforeseen circumstances. This real-time input can then be integrated into integrated logistic data, allowing for further processing steps performed by processor 104 that requires that input. Similarly, a warehouse operator might update the inventory levels using a tablet, ensuring that the system has the most recent data for order fulfillment and stock replenishment.

With continued reference to FIG. 1, the processor is configured to iteratively modify at least one transportation plan 144 based on current logistic datum 148. Iterative modification may ensure at least one transportation plan 144 remains adaptive and responsive to real-time changes and updates in logistics environment. In an embodiment, as the current logistics datum 148 is continuously received, processor 104 may be configured to process and evaluate received current logistics datum 148 against existing transportation plan to identify any discrepancies or areas of improvement. In some embodiments, processor 104 may employ one or more optimization algorithms to adjust the transportation plan. For instance, and without limitation, if the current logistic datum 148 indicates a sudden road closure or traffic congestion, processor 104 may reroute the transportation to avoid delays.

Still referring to FIG. 1, in some embodiments, iterative modification may also consider one or more user inputs as described above. In a non-limiting example, user inputs Feedback from users, such as drivers or logistics managers, may provide valuable insights into on-ground realities that might not be immediately evident from automated data sources. For example, a driver may propose a particular transportation route, while technically shorter, often faces long wait times at checkpoints, making an alternative route more efficient in practice. In another non-limiting example, if current logistic datum 148, sourced from a user's smartphone, indicates unfavorable weather conditions in a particular region, the processor might adjust the transportation plan to delay shipments to that area or choose an alternative mode of transportation that is less affected by the weather.

In a further non-limiting example, and still referring to FIG. 1, one or more sensors such as, without limitation, GPS trackers, temperature sensors, humidity sensors, pressure sensors, accelerometers, gyroscopes, and fuel level sensors, disposed on a transportation vehicle may continuously transmit real-time data (i.e., current logistics datum 148) to processor 104. In some cases, if the sensors detect conditions outside the acceptable range, processor 104 may alert user e.g., the driver or logistics manager to take corrective actions, such as adjusting the vehicle's climate control system or rerouting the vehicle to a closer destination. In some cases, accelerometers and gyroscopes may monitor the vehicle's movement patterns, providing data on sudden stops, accelerations, or turns. Such current logistics datums 148 may be used, by processor 104, in assessing driving behaviors, ensuring cargo safety, and even predicting and preventing potential accidents. Additionally, or alternatively, with an integration of GPS trackers, processor 104 may monitor the vehicle's route in real-time, ensuring it adheres to the planned path specified in at least one transportation plan 144. In some cases, if deviations are detected, due to road closures or traffic conditions, processor 104 may immediately suggest alternative routes to the driver, ensuring timely deliveries.

With continued reference to FIG. 1, in some cases, iteratively modifying at least one transportation plan 144 may include simulating at least one transportation plan 144 by generating a virtual scenario based on at least one transportation plan 144 and current logistics datum 148 using a simulation module. A "simulation module," as described in this disclosure, is a computational tool or software component that can replicate real-world (logistics) scenarios in a controlled virtual environment. A "virtual scenario," for the purpose of this disclosure, refers to a digitally constructed environment or situation that replicates real-world events, conditions, or circumstances. In an embodiment, simulation of at least one transportation plan 144 may enable users and/or processor 104 to predict potential outcomes of at least one transportation plan 144 under various conditions, allowing for proactive adjustments before actual implementation of the plan. In a non-limiting example, such simulation may account for real-time variables as described herein, such as current traffic conditions, weather patterns, vehicle statuses, and other dynamic factors that might influence the execution of at least one transportation plan 144.

Still referring to FIG. 1, in one or more embodiments, the simulation module may utilize a physics-based engine to accurately model a movement of moving entities e.g., transportation vehicles, considering additional factors such as, without limitation, weight, speed, and road conditions. Additionally, or alternatively, simulation module may incorporate one or more AI-driven algorithms as described in this disclosure to predict human behaviors, such as driver reactions to specific traffic situations or customer preferences in delivery timings. In a non-limiting example, if current logistics datum 148 indicates a sudden snowstorm in a particular region, simulation module may create a virtual scenario to assess how the snowstorm may impact at least one transportation plan 144 and data elements thereof e.g., delivery schedules, fuel consumption, and safety of the transportation plan. In some cases, processor 104 may then suggest modifications to at least one transportation plan 144 based on the simulation results, such as rerouting deliveries, adjusting timings, or even postponing certain shipments. In some cases, processor 104 may directly implementing modifications to at least one transportation plan 144 without suggesting to the user. Furthermore, simulation module and/or generated virtual scenario may also be used for training purposes. In a non-limiting example, drivers or logistics managers may be exposed to various virtual scenarios to hone their decision-making skills.

With continued reference to FIG. 1, in an embodiment, one or more generative machine learning models described herein may also be applied by processor 104 to edit, modify, or otherwise manipulate at least one transportation plan 144. In an embodiment, output of training data used to train one or more generative machine learning models such as GAN as described herein may include modifications to existing plans along with optimized routes, suggested transportation modes, estimated carbon emissions, predicted delivery times, cost estimates, and/or the like. For instance, one or more generative machine learning models may be trained on historical transportation plans and their outcomes (may be derived from virtual scenario), allowing one or more generative machine learning models to generate new plans that optimize for certain objectives, such as minimizing carbon emissions or costs. In a non-limiting example, if a company historically used trucking routes that passed through urban areas during peak traffic times, generative machine learning model such as a GAN may suggest one or more alternative routes or timings that avoid such congestion. Similarly, if a certain mode of transportation, like air freight, was found to have high carbon emissions in certain conditions, GAN may suggest alternatives like rail or sea freight for specific scenarios in an updated transportation plan.

With continued reference to FIG. 1, in some cases, current logistics datum 148 may be utilized to refine the system's predictive capabilities. Such dynamic adaptation may ensure one or more machine learning models described herein remains relevant and accurate in the face of changing logistics scenarios and user requirements according to current logistics datum 148. In an embodiment, one or more users and/or discriminator may provide ongoing feedback and further corrections as needed to enhance the accuracy and relevance of the generated transportation plans. In some cases, one or more sensors such as, without limitation, GPS devices, temperature sensors, humidity sensors, or other sensors or devices described herein may provide additional real-time data that may be used as subsequent input data or training data for one or more generative machine learning models described herein. In a non-limiting example, an iterative feedback loop may be created as processor 104 continuously receives current logistics datum 148, identifies errors as a function of current logistics datums 148, delivers corrections based on the identified errors, and monitors user responses on the delivered corrections. Such feedback loop may ensure machine learning module is always learning and improving, adapting to both the changing logistics environment and the evolving needs of the entities.

Still referring to FIG. 1, In an embodiment, processor 104 may be configured to retrain one or more generative machine learning models based on user responses. Alternatively, processor 104 may update any training data as described herein of one or more generative machine learning models by integrating user feedback or response into the original training data described herein. In such an embodiment, iterative feedback loop may allow machine learning module to adapt to the user's needs and performance, enabling one or more generative machine learning models described herein to learn and update based on user responses and generated further feedbacks. For instance, and without limitation, consistent feedback from drivers about certain routes being faster or more efficient than what the system predicts can be used to recalibrate the system's algorithms.

With continued reference to FIG. 1, in one or more embodiments, current logistics datum 148 may be integrated or combined with integrated logistics data collection 112 to provide a comprehensive view of both historical and real-time logistics data. In a non-limiting example, if current logistics datum 148 indicates that a particular transportation route is currently blocked due to an accident, the system can immediately reroute shipments to avoid delays. Such change on at least one transportation plan 144 may also be reflected in integrated logistics data collection 112 as processor 104 may also be configured to update integrated logistics data collection 112 based on current logistics datum 148. In other embodiments, at least one transportation plan 144 may integrate real-time data sources, such as live traffic updates, current weather conditions, or even predictive analytics regarding potential logistical disruptions.

With continued reference to FIG. 1, other exemplary embodiments of generative machine learning models may include, without limitation, long short-term memory networks (LSTMs), (generative pre-trained) transformer (GPT) models, mixture density networks (MDN), and/or the like. As an ordinary person skilled in the art, upon reviewing the entirety of this disclosure, will be aware of various generative machine learning models may be used to generate and/or modify at least one transportation plan 144, and/or any other data described herein.

Still referring to FIG. 1, in a further non-limiting embodiment, machine learning module may be further configured to generate a multi-model neural network that combines various neural network architectures described herein. In a non-limiting example, multi-model neural network may combine LSTM for time-series analysis with GPT models for natural language processing. Such fusion may be applied by processor 104 to generate real-time transportation plan modifications. In some cases, multi-model neural network may also include a hierarchical multi-model neural network, wherein the hierarchical multi-model neural network may involve a plurality of layers of integration; for instance, and without limitation, different models may be combined at various stages of the network. Convolutional neural network (CNN) may be used for image feature extraction for image data received from one or more optical sensors or user inputs, followed by LSTMs for sequential pattern recognition, and a MDN at the end for probabilistic modeling. Other exemplary embodiments of multi-model neural network may include, without limitation, ensemble-based multi-model neural network, cross-modal fusion, adaptive multi-model network, among others. As an ordinary person skilled in the art, upon reviewing the entirety of this disclosure, will be aware of various multi-model neural network and combination thereof that may be implemented by apparatus 100 in consistent with this disclosure.

With continued reference to FIG. 1, in an embodiment, iteratively modifying at least one transportation plan 144 may include identifying a carbon emission outlier 156 as a function of current logistics datum 148 and trained carbon emission projection model 140. As used in this disclosure, a "carbon emission outlier" refers to a data point or a set of data points that deviate from projected carbon emissions 136 that exceeds a pre-determined threshold. In some cases, carbon emission outlier 156 may indicate one or more anomalies, unexpected events, or errors in data collection, transportation operations, or the prediction model itself. In some embodiments, identification of a carbon emission outlier 156 may trigger an alert or notification to relevant stakeholders, prompting additional investigation or corrective actions. In some cases, identifying carbon emission outlier 156 may include utilizing one or more statistical methods, threshold-based checks, or machine learning techniques that compare current logistics datum 148 and/or integrated logistic data collection 112 against one or more predictions made by the carbon emission projection model 140.

In a non-limiting example, and still referring to FIG. 1, if a specific transportation route or mode consistently results in carbon emissions that are significantly higher or lower than the projected carbon emission 136, it may be flagged as an outlier. Such discrepancies may arise from factors such as, without limitation, unexpected traffic conditions, changes in transportation modes, equipment malfunctions, or even data recording errors. In another non-limiting example, if a truck's reported carbon emissions are significantly higher than model's predictions for a specific route and load, it might indicate a malfunctioning emission control system or an error in fuel consumption reporting. On the other hand, if a shipping route consistently shows lower emissions than predicted, it might suggest that the ships on that route are using more efficient technologies or practices than previously accounted for in the model.

Continuing refer to FIG. 1, identifying carbon emission outlier 156 may include clustering plurality of logistics vectors and/or current logistics datums 148 in logistics vector space using one or more clustering algorithms. In some cases, clustering algorithm may be implemented, as a non-limiting example, using a k-means clustering algorithm. A "k-means clustering algorithm" as used in this disclosure, includes cluster analysis that partitions n observations or unclassified cluster data entries into k clusters in which each observation or unclassified cluster data entry belongs to the cluster with the nearest mean, using, for instance behavioral training set as described above. "Cluster analysis" as used in this disclosure, includes grouping a set of observations or data entries in way that observations or data entries in the same group or cluster are more similar to each other than to those in other groups or clusters. Cluster analysis may be performed by various cluster models that include connectivity models such as hierarchical clustering, centroid models such as k-means, distribution models such as multivariate normal distribution, density models such as density-based spatial clustering of applications with nose (DBSCAN) and ordering points to identify the clustering structure (OPTICS), subspace models such as biclustering, group models, graph-based models such as a clique, signed graph models, neural models, and the like. Cluster analysis may include hard clustering whereby each observation or unclassified cluster data entry belongs to a cluster or not. Cluster analysis may include soft clustering or fuzzy clustering whereby each observation or unclassified cluster data entry belongs to each cluster to a certain degree such as for example a likelihood of belonging to a cluster; for instance, and without limitation, a fuzzy clustering algorithm may be used to identify clustering of transportation routes based on multiple factors such as speed, cost, and carbon emission. Cluster analysis may include strict partitioning clustering whereby each observation or unclassified cluster data entry belongs to exactly one cluster. Cluster analysis may include strict partitioning clustering with outliers whereby observations or unclassified cluster data entries may belong to no cluster and may be considered outliers. Cluster analysis may include overlapping clustering whereby observations or unclassified cluster data entries may belong to more than one cluster. Cluster analysis may include hierarchical clustering whereby observations or unclassified cluster data entries that belong to a child cluster also belong to a parent cluster.

With continued reference to FIG. 1, processor 104 may generate a k-means clustering algorithm receiving unclassified logistics vectors and outputs a definite number of classified data entry clusters wherein the data entry clusters each contain cluster data entries. K-means algorithm may select a specific number of groups or clusters to output, identified by a variable "k." Generating a k-means clustering algorithm includes assigning inputs containing unclassified data to a "k-group" or "k-cluster" based on feature similarity. Centroids of k-groups or k-clusters may be utilized to generate classified data entry cluster. K-means clustering algorithm may select and/or be provided "k" variable by calculating k-means clustering algorithm for a range of k values and comparing results. K-means clustering algorithm may compare results across different values of k as the mean distance between cluster data entries and cluster centroid. K-means clustering algorithm may calculate mean distance to a centroid as a function of k value, and the location of where the rate of decrease starts to sharply shift, this may be utilized to select a k value. Centroids of k-groups or k-cluster include a collection of feature values which are utilized to classify data entry clusters containing cluster data entries. K-means clustering algorithm may act to identify clusters of closely related to, for example, and without limitation, transportation routes, which may be provided with specific logistical recommendations; this may, for instance, help generating or modifying at least one transportation plan 144 by grouping similar routes together, leading to more efficient resource allocation. Additionally, upon subsequent iterations, identify new clusters to be provided updated logistical strategies, to which additional transportation routes may be classified, or to which previously used transportation routes may be reclassified.

With continued reference to FIG. 1, generating a k-means clustering algorithm may include generating initial estimates for k centroids which may be randomly generated or randomly selected from unclassified data input. K centroids may be utilized to define one or more clusters. K-means clustering algorithm may assign unclassified data to one or more k-centroids based on the squared Euclidean distance by first performing a data assigned step of unclassified data. K-means clustering algorithm may assign unclassified data to its nearest centroid based on the collection of centroids $c_i$ of centroids in set C. Unclassified data may be assigned to a cluster based on $\mathrm{argmin}_{c_i \in c}\, \mathrm{dist}(c_i, x)^2$, where argmin includes argument of the minimum, ci includes a collection of centroids in a set C, and dist includes standard Euclidean distance. K-means clustering module may then recompute centroids by taking mean of all cluster data entries assigned to a centroid's cluster. This may be calculated based on $c_i = 1/|S_i| \Sigma x_i \ni S_i^{ri}$. K-means clustering algorithm may continue to repeat these calculations until a stopping criterion has been satisfied such as when cluster data entries do not change clusters, the sum of the distances have been minimized, and/or some maximum number of iterations has been reached.

Still referring to FIG. 1, the k-means clustering algorithm may be configured to calculate a degree of similarity index value. A "degree of similarity index value," as used in this disclosure, includes a distance measurement indicating the proximity between each data entry cluster generated by the k-means clustering algorithm and a selected physiological data set. In some cases, the degree of similarity index value may incorporate vector distance, as previously described. This degree of similarity index value may serve as an indicator of how closely a given set of data aligns or matches with the characteristics of a specific cluster. In some cases, k-means clustering algorithm may evaluate the distances of individual data points to the centroids of the k-number of clusters output by the algorithm. Short distances between a data point and a cluster centroid signify a higher degree of similarity between the data point and that particular cluster. Conversely, longer distances between a data point and a cluster suggest a lower degree of similarity. Such information can be crucial for decision-making processes, especially when determining the most suitable cluster for a new data point or when reassessing the cluster memberships of existing data points. For instance, and without limitation, if a new route data closely aligns with a cluster representing efficient and low-carbon emission routes, it might be considered a preferred route for future shipments. On the other hand, routes that align with clusters indicating higher emissions or inefficiencies might be flagged for review or optimization.

With continued reference to FIG. 1, k-means clustering algorithm selects a classified data entry cluster as a function of the degree of similarity index value. In an embodiment, k-means clustering algorithm may select a classified data entry cluster with the smallest degree of similarity index value indicating a high degree of similarity between logistics vectors and the data entry cluster. Alternatively, or additionally k-means clustering algorithm may select a plurality of clusters having low degree of similarity index values to logistics vectors indicative of greater degrees of similarity. Degree of similarity index values may be compared to a threshold number indicating a minimal degree of relatedness suitable for inclusion of a set of data points in a cluster, where degree of similarity indices a-n falling under the threshold number may be included as indicative of high degrees of relatedness. The above-described illustration of clustering using k-means clustering is included for illustrative purposes only and should not be construed as limiting potential implementation of clustering and/or feature learning algorithms; persons skilled in the art, upon reviewing the entirety of this disclosure, will be aware of various additional or alternative feature learning approaches that may be used consistently with this disclosure.

With continued reference to FIG. 1, in a non-limiting example, identification of carbon emission outlier 156 may be visualized, by processor 104, as mapping current logistics datum 148 into the logistic vector space. Mapping of current logistics datum 148 may be achieved by projecting the current logistics datum 148 onto logistics vector space. Once projected, position of current logistics datum 148 within the logistic vector space may be compared against the positions of the existing plurality of logistics vectors. In some embodiments, one or more vector distances between projected current logistics datum 148 and each of logistics vectors in the space may be computed by processor 104, wherein the vector distances may provide measures of similarity or dissimilarity between the current logistics datum and the existing data as described above. Carbon emission outlier 156 can be identified, by processor 104, when vector distance between projected current logistics datum 148 and a nearest logistics vector exceeds a predefined threshold. This indicates that current logistics datum 148 may have a significantly different carbon emission profile compared to the majority of the logistic vectors in the logistic vector space. For instance, and without limitation, if most logistics vectors in the space represent transportation modes with low carbon emissions, and projected current logistics datum 148 corresponds to a transportation mode with unusually high emissions, it would be positioned far from the cluster of low-emission vectors. Processor 104 may then flag such current logistics datum as a carbon emission outlier 156.

With continued reference to FIG. 1, identifying carbon emission outlier 156 may include detecting, by at least a processor, a carbon emission deviation as a function of at least one projected carbon emission 136 and plurality of historical carbon emission using a statistical model. As used in this disclosure, a "Carbon emission deviation" is an increase or decrease in carbon emissions due to integrated logistics data collection 112 and/or current logistics datum 148 as described above. For example, and without limitation, statistical model may be trained on historical carbon emission data and may indicate that a particular transport route emitted 10% and/or 10 kg more emissions than average due to construction on the road. As a result, statistical model may determine that construction on the road may result in a carbon deviation of +10% and/or in an increase of 10 kg. In a non-limiting embodiment, statistical model may employ statistical techniques such as standard deviation calculations, regression analysis, or hypothesis testing to determine if projected carbon emission 136 falls outside of expected ranges or behaves differently than historical carbon emission. In some cases, if projected carbon emission 136 is found to be an extreme value or significantly different from what statistical model determined based on historical carbon emission, for example, and without limitation, by comparing detected carbon emission deviation against a pre-determined deviation threshold. Such projected carbon emission can be flagged, by processor 104, as a carbon emission outlier 156.

With continued reference to FIG. 1, iteratively modifying at least one transportation plan 144 may further include determining at least one carbon emission offset 160 as a function of carbon emission outlier 156. As used in this disclosure, a "carbon emission offset" refers to a compensatory measure taken to neutralize or counterbalance a specific amount of carbon emissions that have been produced, ensuring that the net carbon emissions are reduced or maintained at a desired level. In an embodiment, if a carbon emission outlier 156 is identified, indicating that carbon emissions are higher than expected for a particular transportation plan, a corresponding carbon emission offset 160 may be determined, wherein the corresponding carbon emission offset 160 may specify the necessary compensatory actions required to neutralize the excess emissions.

In one or more embodiments, and still referring to FIG. 1, at least one carbon emission offset 160 may involve one or more implementations regarding route optimization, for example, and without limitation, at least one carbon emission offset 160 may include one or more actions configured to adjust transportation routes as described above to minimize distances traveled or avoid areas with heavy traffic congestion, thereby reducing fuel consumption and emissions. In some embodiments, at least one carbon emission offset 160 may involve one or more implementations designed to increase vehicle efficiency. In a non-limiting example, at least one carbon emission offset 160 may include one or more actions related to switching transportation vehicles that are more fuel-efficient or utilize cleaner fuels. For instance, and without limitation, replacing older trucks with newer models that have better fuel economy or transitioning to electric or hybrid vehicles.

In one or more embodiments, and still referring to FIG. 1, at least one carbon emission offset 160 may also include one or more implementations regarding load consolidation. In a non-limiting example, at least one carbon emission offset 160 may include practice related to combining shipments or optimizing load distribution to ensure vehicles are operating at a desired capacity, reducing the number of trips required. Additionally, or alternatively, at least one carbon emission offset 160 may include one or more implementations of dynamic scheduling; for instance, and without limitation, at least one carbon emission offset 160 may include actions configured to adjust transportation schedules based on real-time data, e.g., current logistics datum 148, such as traffic conditions, current weather, and/or the like to avoid delays and reduce idling times during the transportation.

Still referring to FIG. 1, in other embodiments, at least one carbon emission offset 160 may further include actions related to modifying transportation plan based on environmental data for example, and without limitation, on days with high air pollution levels, transportation routs may be adjusted to avoid contributing further to the pollution in those areas. In further embodiments, processor 104 may perform order data analysis, as part of carbon emission offset determination, wherein order data 116 may be analyzed and transportation plan may be optimized based on detected order patterns. One or more machine learning models such as, without limitation, regression models, neural networks, decision trees, or random forests may be employed to facilitate such optimization and determination of at least one carbon emission offset 160. In a non-limiting example, a carbon emission offset determination model may be generated and/or trained, by processor 104, using emission training data containing a plurality of input data such as, without limitation, transportation plans, carbon emission deviations, carbon emission outliers, integrated logistic data collections and/or the like correlated to a plurality of carbon emission offsets as output. In some cases, emission offset training data may be retrieved, by processor 104, from logistics database 128 as described above. Determining at least one carbon emission offset 160 may further include determining at least one carbon emission offset 160 as a function of carbon emission outlier 156 using the trained carbon emission offset determination model.

With continued reference to FIG. 1, in an embodiment, adjusting at least one transportation plan 144 may include updating at least one transportation plan 144 and/or integrated logistics data collection 112 as a function of at least one carbon emission offset 160 as described above and retraining carbon emission projection model 140 using updated integrated logistic data 112. In a non-limiting example, if a particular route or mode of transportation specified in at least one transportation plan 144 results in a carbon emission that exceeds the desired threshold (carbon emission outlier 156 may be identified), and at least one carbon emission offset 160 such as modification to at least one transportation plan 144 in which supports green energy, sustainable transportation, determined by processor 104 as described above, may be implemented on at least one transportation plan 144 to neutralize the excess carbon emissions, wherein at least one transportation plan 144 may be updated to reflect such modification.

Still referring to FIG. 1, in some cases, determining at least one carbon emission offset 160 may include classifying carbon emission outlier 156 into a plurality of carbon emission categories. As used in this disclosure, "carbon emission categories" are distinct groupings that represent the source, type, or nature of carbon emissions associated with logistics activities. In some cases, plurality of carbon emission categories may include, without limitation, direct emissions from fuel combustion, emissions from electricity consumption, emissions from transportation mode (e.g., road, rail, air, or sea), emissions from vehicle type (e.g., diesel truck, electric car, hybrid vehicle), emissions related to cargo type or weight, among others. In a non-limiting example, if a carbon emission outlier 156 is classified, by processor 104, under the category of "emissions from electricity consumption," the appropriate offset might involve one or more actions related to improving energy efficiency in logistic operations. Processor 104 may then be configured to select at least one carbon emission offset 160 from a set of pre-defined carbon emission offsets based on the identified carbon emission category. For instance, and without limitation, for carbon emission category related to "direct emissions from fuel combustion," at least one carbon emission offset 160 may be identified by processor 104, wherein the at least one carbon emission offset may actions related to transitioning to cleaner fuels or enhancing fuel efficiency in vehicles.

With continued reference to FIG. 1, in one or more embodiments, a classifier, such as without limitation, a carbon emission category classifier may be generated by processor 104 configured to classify carbon emission outlier 156 into plurality of carbon emission categories as listed above. A "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Processor 104 and/or another device may generate a classifier using a classification algorithm, defined as a processes whereby a processor 104 derives a classifier from training data. In some cases, carbon emission category classifier may be trained on carbon emission category training data containing a plurality of carbon emission outliers as input correlated to a plurality of carbon emission categories as output. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

With continued reference to FIG. 1, processor 104 may be further configured to transmit at least a modified transportation plan 144 to a user device 164 affiliated to the user. User device may include any user device and/or computing device as described herein. In some cases, transmission of at least a modified transportation plan 144 may be facilitated through wired or wireless communication protocols, ensuring that user is able to receives real-time updates regarding any changes or modifications made to at least one transportation plan 144. Processor 104 may be configured to display at least a modified transportation plan 144 on a display device 168 of the user device, providing a visual representation of the plan. As used in this disclosure, a "display device" refers to an electronic device that visually presents information to the user. In some cases, display device 168 may be configured to project or show visual content generated by computers, video devices, or other electronic mechanisms. In a non-limiting example, display device 168 may include one or more displays, wherein each display may vary in size, resolution, technology, and functionality. Additionally, or alternatively, display device 168 may include a graphical user interface (GUI). In a non-limiting example, display device 168 having a GUI may be able to show any data and/or visual elements described herein in various format such as, textural, graphical, video among others, in either monochrome or color.

With further reference to FIG. 1, in some cases, display device 168 on user device 164 can be interactive, allowing user to view details, make further modifications, or provide feedback on one or more proposed transportation plan. Notifications, alerts, or prompts described herein may also be integrated to inform user of significant changes or required actions. In non-limiting examples, one or more event handlers within GUI may be set up to trigger one or more specific actions or notifications based on certain conditions or events. For instance, if modified transportation plan 144 suggests a transportation route change due to an identified carbon emission outlier, a first event handler may be configured to automatically notify the user with a pop-up alert or sound notification on user device 164. Similarly, if at least one transportation plan 144 requires immediate user intervention or approval, a second event handler may prompt the user to take the necessary action. In such an embodiment, event handlers may be configured to ensure that the user stays informed and engaged throughout any processing steps and combinations thereof, allowing for a collaborative and efficient approach to logistics management.

Figure 2:
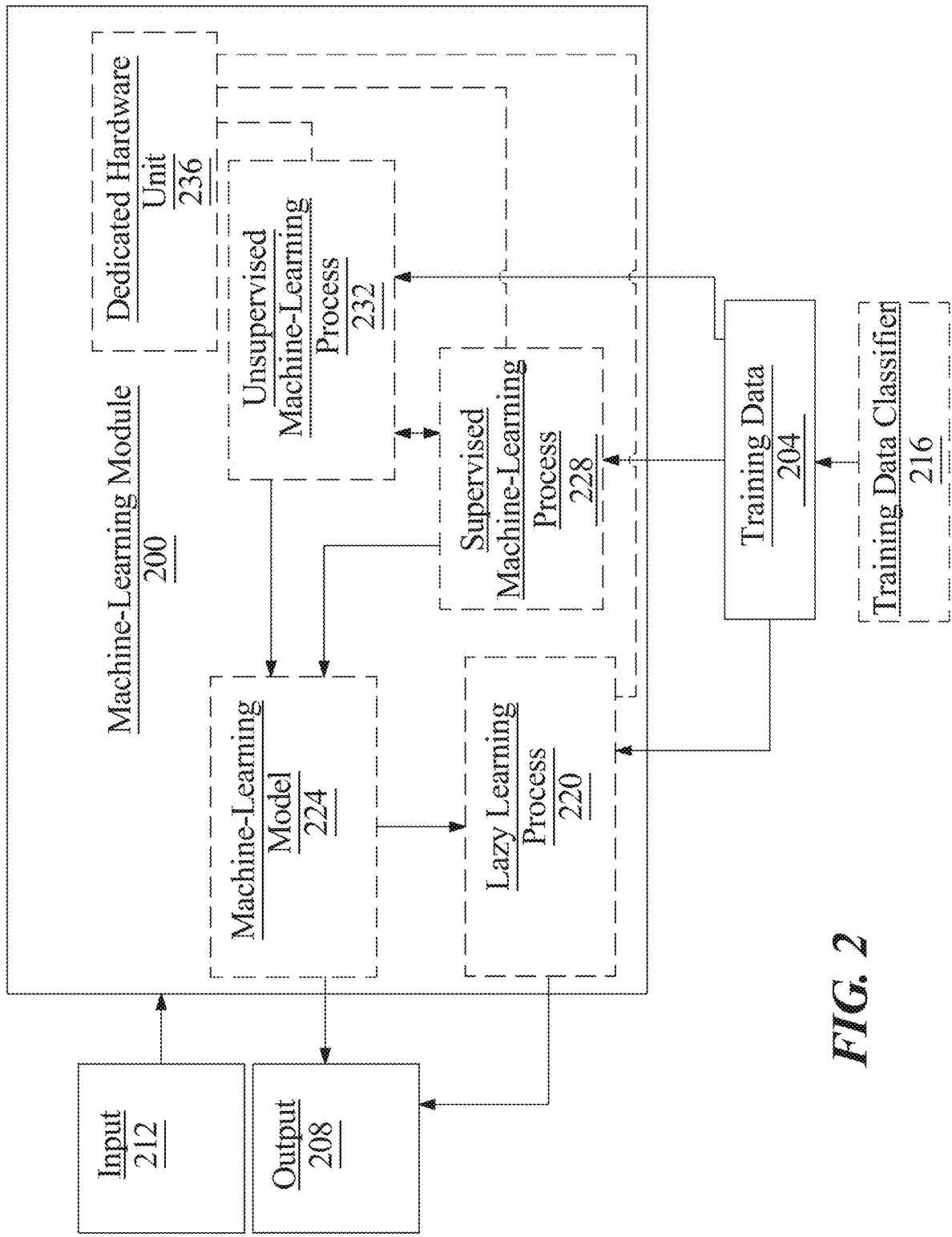
FIG. 2 is a block diagram of exemplary embodiment of a machine learning module.

Referring now to FIG. 2, an exemplary embodiment of a machine-learning module 200 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 204 to generate an algorithm instantiated in hardware or software logic, data structures, and/or functions that will be performed by a computing device/module to produce outputs 208 given data provided as inputs 212; this is in contrast to a non-machine learning software program where the commands to be executed are determined in advance by a user and written in a programming language.

Still referring to FIG. 2, "training data," as used herein, is data containing correlations that a machine-learning process may use to model relationships between two or more categories of data elements. For instance, and without limitation, training data 204 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 204 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 204 according to various correlations; correlations may indicate causative and/or predictive links between categories of data elements, which may be modeled as relationships such as mathematical relationships by machine-learning processes as described in further detail below. Training data 204 may be formatted and/or organized by categories of data elements, for instance by associating data elements with one or more descriptors corresponding to categories of data elements. As a non-limiting example, training data 204 may include data entered in standardized forms by persons or processes, such that entry of a given data element in a given field in a form may be mapped to one or more descriptors of categories. Elements in training data 204 may be linked to descriptors of categories by tags, tokens, or other data elements; for instance, and without limitation, training data 204 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively, or additionally, and continuing to refer to FIG. 2, training data 204 may include one or more elements that are not categorized; that is, training data 204 may not be formatted or contain descriptors for some elements of data. Machine-learning algorithms and/or other processes may sort training data 204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 204 to be made applicable for two or more distinct machine-learning algorithms as described in further detail below. Training data 204 used by machine-learning module 200 may correlate any input data as described in this disclosure to any output data as described in this disclosure. As a non-limiting illustrative example training data may include a plurality of logistics data collections as input correlated to a plurality of projected carbon emissions as output.

Further referring to FIG. 2, training data may be filtered, sorted, and/or selected using one or more supervised and/or unsupervised machine-learning processes and/or models as described in further detail below; such models may include without limitation a training data classifier 216. Training data classifier 216 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 200 may generate a classifier using a classification algorithm, defined as a processes whereby a computing device and/or any module and/or component operating thereon derives a classifier from training data 204. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 216 may classify elements of training data to [something that characterizes a sub-population, such as a cohort of persons and/or other analyzed items and/or phenomena for which a subset of training data may be selected].

With further reference to FIG. 2, training examples for use as training data may be selected from a population of potential examples according to cohorts relevant to an analytical problem to be solved, a classification task, or the like. Alternatively, or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Still referring to FIG. 2, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively, or additionally, one or more training examples may be identified as having poor quality data, where "poor quality" is defined as having a signal to noise ratio below a threshold value.

As a non-limiting example, and with further reference to FIG. 2, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity, and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 2, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively, or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 2, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to cleanup side-effects of compression.

Still referring to FIG. 2, machine-learning module 200 may be configured to perform a lazy-learning process 220 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 204. Heuristic may include selecting some number of highest-ranking associations and/or training data 204 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively, or additionally, and with continued reference to FIG. 2, machine-learning processes as described in this disclosure may be used to generate machine-learning models 224. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 224 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 224 may be generated by creating an artificial neural network, such as a convolutional neural network comprising an input layer of nodes, one or more intermediate layers, and an output layer of nodes. Connections between nodes may be created via the process of "training" the network, in which elements from a training data 204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 2, machine-learning algorithms may include at least a supervised machine-learning process 228. At least a supervised machine-learning process 228, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include integrated logistics data collections as described above as inputs, projected carbon emission as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 204. Persons skilled in the art, upon reviewing the entirety of this disclosure, will be aware of various possible variations of at least a supervised machine-learning process 228 that may be used to determine relation between inputs and outputs. Supervised machine-learning processes may include classification algorithms as defined above.

With further reference to FIG. 2, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 2, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 2, machine learning processes may include at least an unsupervised machine-learning processes 232. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 232 may not require a response variable; unsupervised processes 232 may be used to find interesting patterns and/or inferences between variables, to determine a degree of correlation between two or more variables, or the like.

Still referring to FIG. 2, machine-learning module 200 may be designed and configured to create a machine-learning model 224 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of I divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g., a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 2, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 2, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 2, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 2, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 2, one or more processes or algorithms described above may be performed by at least a dedicated hardware unit 236. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 236 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 236 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 236 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 3:
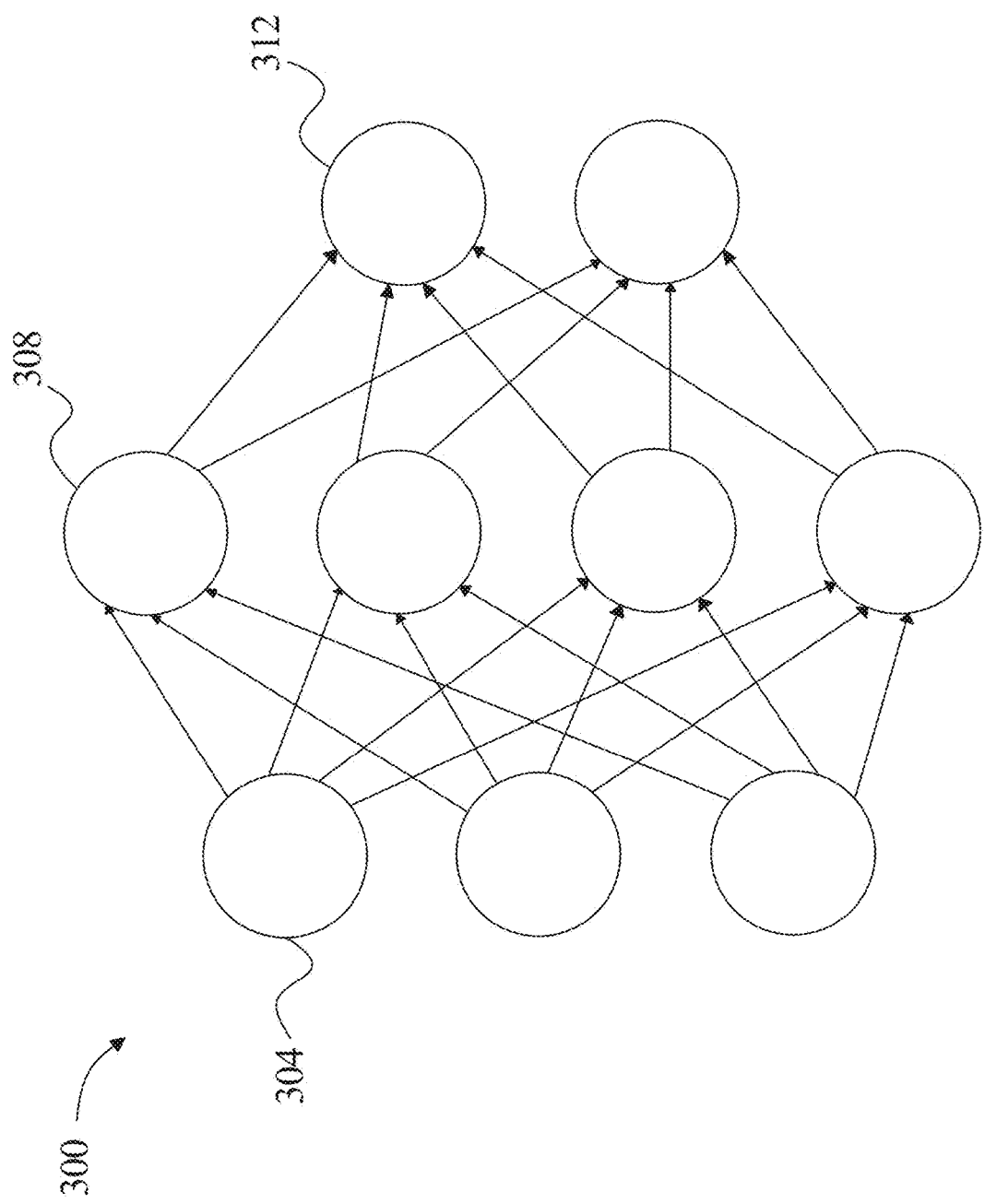
FIG. 3 is a diagram of an exemplary embodiment of a neural network.

Referring now to FIG. 3, an exemplary embodiment of neural network 300 is illustrated. A neural network 300 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 304, one or more intermediate layers 308, and an output layer of nodes 312. Connections between nodes may be created via the process of "training"

the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network."

With continued reference to FIG. 3, in an embodiment, neural network 300 may include a deep neural network (DNN). As used in this disclosure, a "deep neural network" is defined as a neural network with two or more hidden layers. In a non-limiting example, neural network 300 may include a convolutional neural network (CNN). A "convolutional neural network," for the purpose of this disclosure, is a neural network in which at least one hidden layer is a convolutional layer that convolves inputs to that layer with a subset of inputs known as a "kernel," along with one or more additional layers such as pooling layers, fully connected layers, and the like. In some cases, CNN may include, without limitation, a deep neural network (DNN) extension. Mathematical (or convolution) operations performed in the convolutional layer may include convolution of two or more functions, where the kernel may be applied to input data e.g., one or more data points or datasets of integrated logistics data collection as described above with reference to FIG. 1, through a sliding window approach. In some cases, convolution operations may enable processor 104 to detect local/global patterns, edges, textures, and any other features described herein within. features may be passed through one or more activation functions, such as without limitation, Rectified Linear Unit (ReLU), to introduce non-linearities into one or more processing step described herein. Additionally, or alternatively, CNN may also include one or more pooling layers, wherein each pooling layer is configured to reduce the dimensionality of input data while preserving essential features within the input data. In a non-limiting example, CNN may include one or more pooling layer configured to reduce the dimensions of feature maps by applying downsampling, such as max-pooling or average pooling, to small, non-overlapping regions of one or more features.

Still referring to FIG. 3, CNN may further include one or more fully connected layers configured to combine features extracted by the convolutional and pooling layers as described above. In some cases, one or more fully connected layers may allow for higher-level pattern recognition. In a non-limiting example, one or more fully connected layers may connect every neuron (i.e., node) in its input to every neuron in its output, functioning as a traditional feedforward neural network layer. In some cases, one or more fully connected layers may be used at the end of CNN to perform high-level reasoning and produce the final output such as, without limitation, projected carbon emission, carbon emission categories, carbon emission offsets and/or the like. Further, each fully connected layer may be followed by one or more dropout layers configured to prevent overfitting, and one or more normalization layers to stabilize the learning process described herein.

With continued reference to FIG. 3, in an embodiment, training neural network (i.e., CNN) may include selecting a suitable loss function to guide the training process. In a non-limiting example, a loss function that measures the difference between the predicted output and the ground truth e.g., output data within provided training data may be used, such as, without limitation, mean squared error (MSE) or a custom loss function may be designed for one or more embodiments described herein. Additionally, or alternatively, optimization algorithms, such as stochastic gradient descent (SGD), may then be used to adjust the parameters of neural network to minimize such loss. In a further non-limiting embodiment, instead of directly predicting a label or a group of data points, CNN may be trained as a regression model to predict numeric data outputs. Additionally, CNN may be extended with additional deep learning techniques, such as recurrent neural networks (RNNs) or attention mechanism, to capture additional features and/or data relationships within input data. These extensions may further enhance the accuracy and robustness of one or more processing steps described herein involving utilization of one or more machine learning models, in particular, neural networks.

Figure 4:
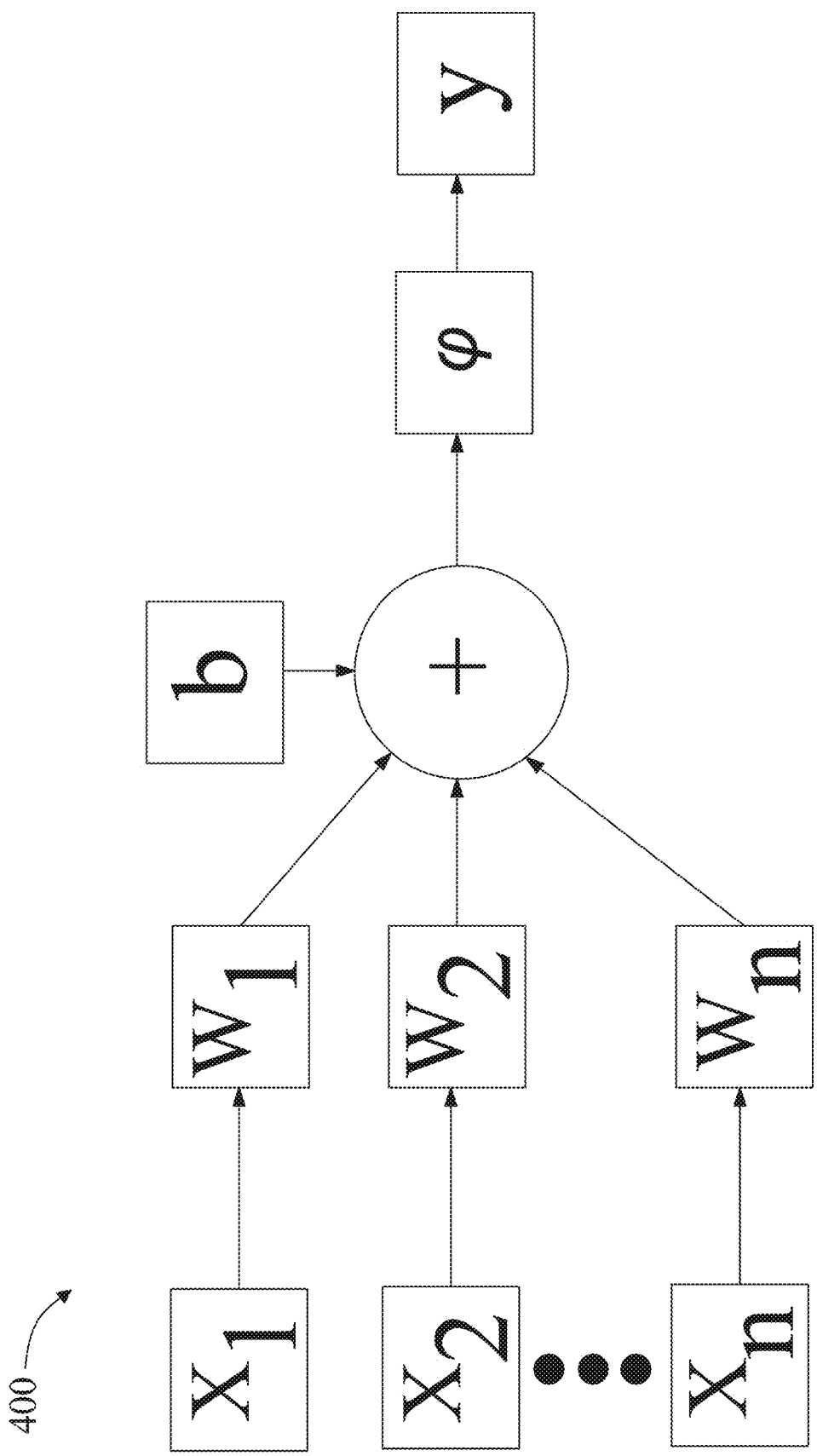
FIG. 4 is a block diagram of an exemplary embodiment of a node of a neural network.

Referring now to FIG. 4, an exemplary embodiment of a node 400 of a neural network is illustrated. A node may include, without limitation, a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x) = \tanh^2(x)$, a rectified linear unit function such as $f(x) = \max(0, x)$, a "leaky" and/or "parametric" rectified linear unit function such as $f(x) = \max(ax, x)$ for some a, an exponential linear units function such as $$f(x) = \begin{cases} x & \text{for } x \geq 0 \\ \alpha(e^x - 1) & \text{for } x < 0 \end{cases}$$

for some value of α (this function may be replaced and/or weighted by its. own derivative in some embodiments), a softmax function such as $$f(x_i) = \frac{e^x}{\sum_i x_i}$$

where the inputs to an instant layer are $x_i$, a swish function such as $f(x) = x * \text{sigmoid}(x)$, a Gaussian error linear unit function such as $f(x)=a(1+\tanh(\sqrt{2/\pi}(x+bx^r)))$ for some values of a, b, and r, and/or a scaled exponential linear unit function such as $$f(x) = \begin{cases} \alpha(e^x - 1) & \text{for } x < 0 \\ x & \text{for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally, or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input xi may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 5:
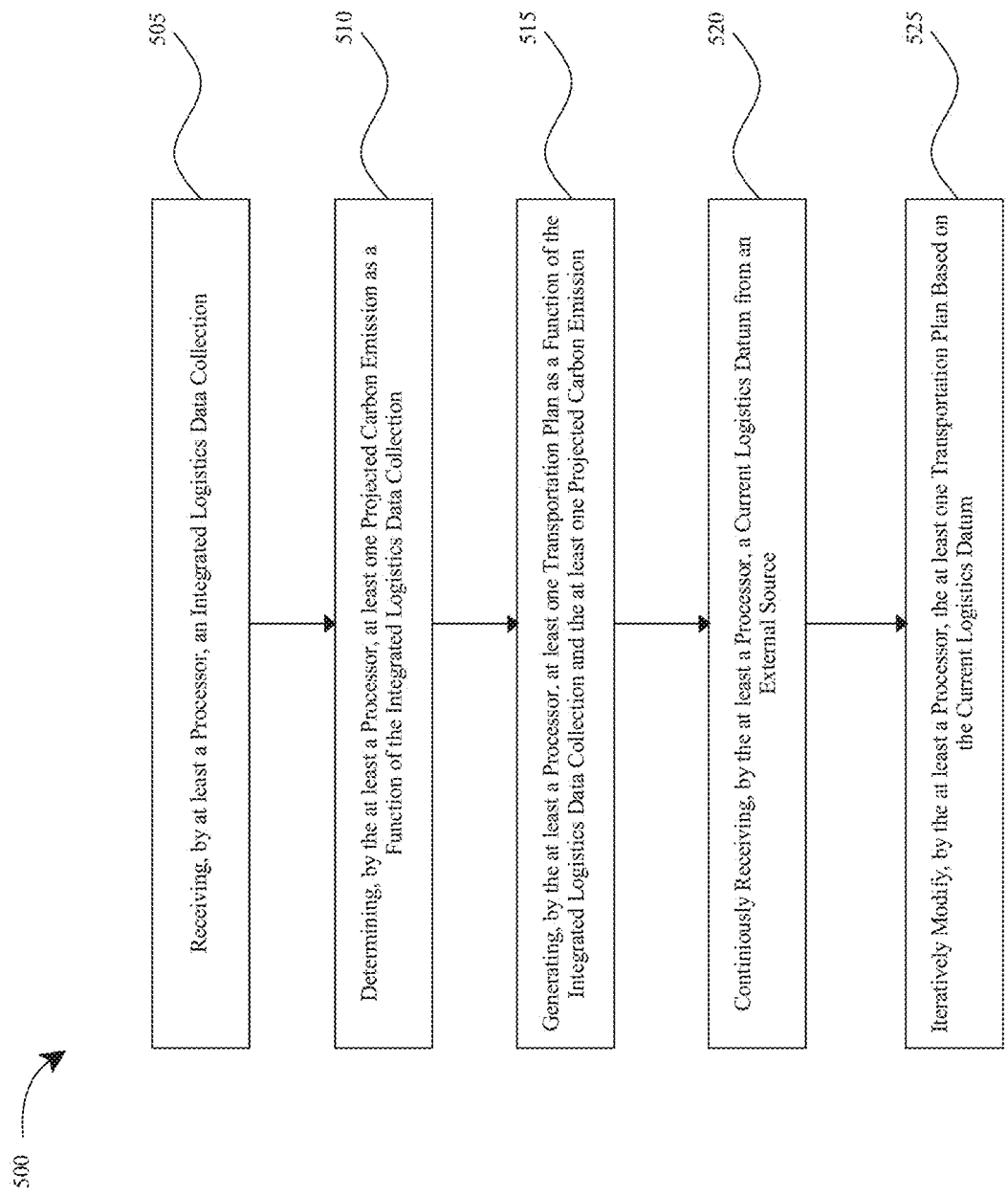
FIG. 5 is a flow diagram illustrating an exemplary embodiment of a method for carbon emission optimization using machine-learning.

Now referring to FIG. 5, a flow diagram of an exemplary embodiment of a method 500 for carbon emission optimization using machine-learning is illustrated. Method 500 includes a step 505 of receiving, using at least a processor, an integrated logistics data collection. In some embodiments, the integrated logistic data collection may include order data, transportation data, and environmental data. In some embodiments, the integrated logistics data collection may be associated with a plurality of temporal elements. This may be implemented, without limitation, as described above with reference to FIGS. 1-4.

With continued reference to FIG. 5, method 500 includes a step 510 of determining, using the at least a processor, at least one projected carbon emission as a function of the integrated logistics data collection, wherein determining the at least one projected carbon emission may include training a carbon emission projection model using carbon emission training data, wherein the carbon emission training data contains a plurality of logistics datasets as input correlated to a plurality of historical carbon emissions as output, and determining the at least one projected carbon emission as a function of the integrated logistics data collection using the trained carbon emission projection model. In some embodiments, determining the at least one projected carbon emission may include transforming the integrated logistics data collection into a logistic vector space by generating a plurality of logistics vectors using a vector embedding technique and determining a vector distance in the logistic vector space between each logistics vector of the plurality of logistics vectors. This may be implemented, without limitation, as described above with reference to FIGS. 1-4.

With continued reference to FIG. 5, method 500 includes a step 515 of generating, using the at least a processor, at least one transportation plan as a function of the at least one projected carbon emission. This may be implemented, without limitation, as described above with reference to FIGS. 1-4.

With continued reference to FIG. 5, method 500 includes a step 520 of continuously receiving, using the at least a processor, a current logistics datum from an external source. This may be implemented, without limitation, as described above with reference to FIGS. 1-4.

With continued reference to FIG. 5, method 500 includes a step 525 of iteratively modifying, using the at least a processor, the at least one transportation plan, wherein iteratively modifying the at least one transportation plan comprises identifying a carbon emission outlier as a function of the current logistics datum and the trained carbon emission projection model. determining at least one carbon emission offset as a function of the carbon emission outlier and updating the transportation plan to incorporate the at least one carbon emission offset. In some embodiments, identifying the carbon emission outlier may include projecting the current logistics datum to the logistic vector space, and identifying the carbon emission outlier as a function of the vector distances between the projected current logistics datum and the plurality of logistics vectors. In some embodiments, iteratively modifying the at least one transportation plan may include simulating the at least one transportation plan by generating a virtual scenario based on the at least one transportation plan and the current logistics datum using a simulation module. In some embodiments, identifying the carbon emission outlier may include detecting a carbon emission deviation as a function of the least one projected carbon emission and a plurality of historical carbon emissions using a statistical model, comparing the detected carbon emission deviation against a deviation threshold, and identifying the carbon emission outlier based on the comparison. In some embodiments, determining the at least one carbon emission offset may include classifying the carbon emission outlier into a plurality of carbon emission categories and selecting at least one carbon emission offset from a set of pre-defined carbon emission offsets based on the plurality of carbon emission categories. In other embodiments, adjusting the transportation plan may include updating the integrated logistic data collection as a function of the at least one carbon emission offset and retraining the carbon emission projection model using the updated integrated logistic data. This may be implemented, without limitation, as described above with reference to FIGS. 1-4.

With continued reference to FIG. 5, method 500 may further include steps of transmit the at least a modified transportation plan to a user device affiliated to a user and display the at least a modified transportation plan at a display device of the user device. This may be implemented, without limitation, as described above with reference to FIGS. 1-4.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 6:
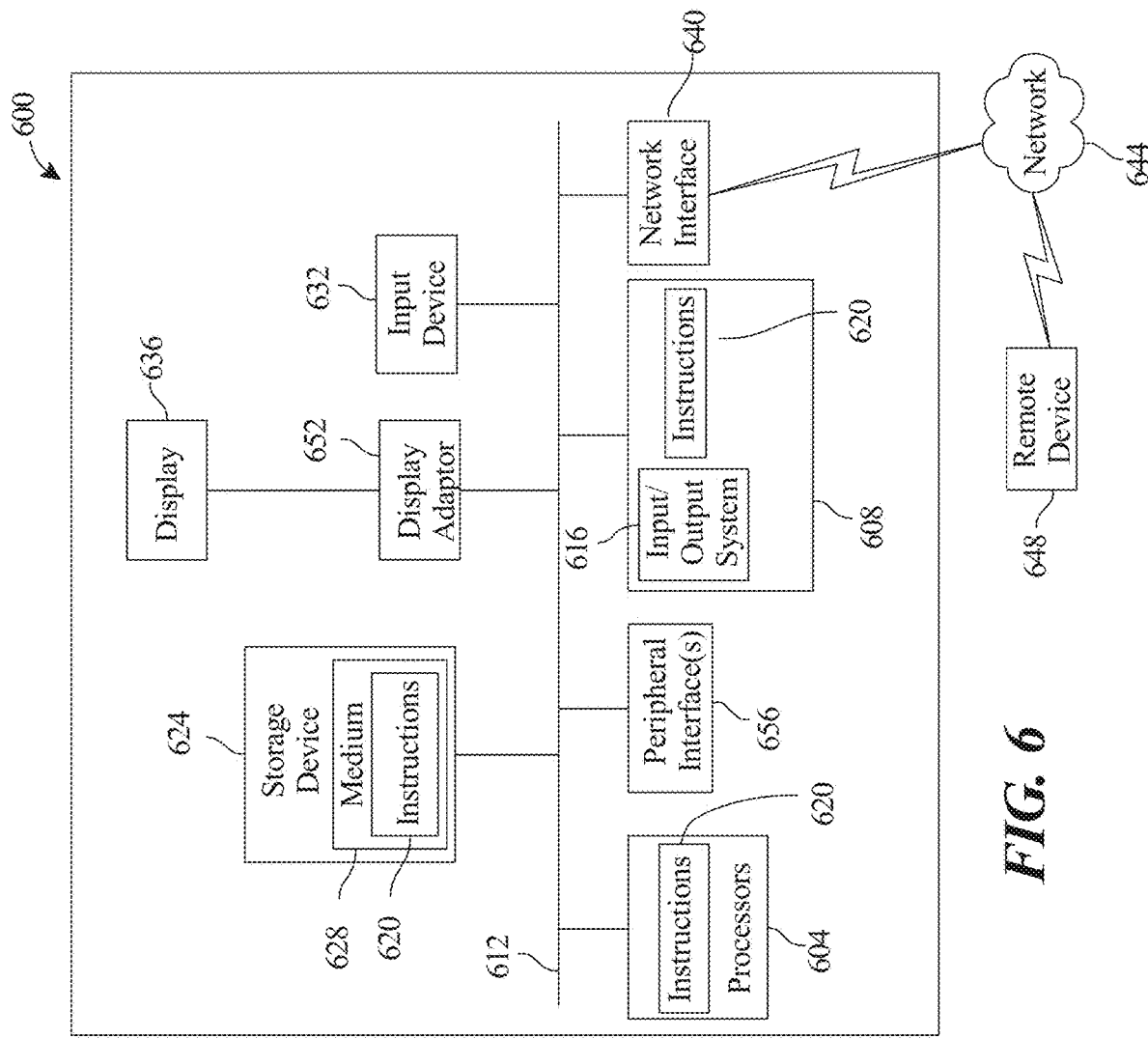
FIG. 6 is a block diagram of a computing system that can be used to implement any one or more of the methodologies disclosed herein and any one or more portions thereof.

FIG. 6 shows a diagrammatic representation of one embodiment of a computing device in the exemplary form of a computer system 600 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 600 includes a processor 604 and a memory 608 that communicate with each other, and with other components, via a bus 612. Bus 612 may include any of several types of bus structures including, but not limited to, a memory bus, a memory controller, a peripheral bus, a local bus, and any combinations thereof, using any of a variety of bus architectures.

Processor 604 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 604 may be organized according to Von Neumann and/or Harvard architecture as a non-limiting example. Processor 604 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 608 may include various components (e.g., machine-readable media) including, but not limited to, a random-access memory component, a read only component, and any combinations thereof. In one example, a basic input/output system 616 (BIOS), including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

Computer system 600 may also include a storage device 624. Examples of a storage device (e.g., storage device 624) include, but are not limited to, a hard disk drive, a magnetic disk drive, an optical disc drive in combination with an optical medium, a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 624 (or one or more components thereof) may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data for computer system 600. In one example, software 620 may reside, completely or partially, within machine-readable medium 628. In another example, software 620 may reside, completely or partially, within processor 604.

Computer system 600 may also include an input device 632. In one example, a user of computer system 600 may enter commands and/or other information into computer system 600 via input device 632. Examples of an input device 632 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 632 may be interfaced to bus 612 via any of a variety of interfaces (not shown) including, but not limited to, a serial interface, a parallel interface, a game port, a USB interface, a FIREWIRE interface, a direct interface to bus 612, and any combinations thereof. Input device 632 may include a touch screen interface that may be a part of or separate from display 636, discussed further below. Input device 632 may be utilized as a user selection device for selecting one or more graphical representations in a graphical interface as described above.

A user may also input commands and/or other information to computer system 600 via storage device 624 (e.g., a removable disk drive, a flash drive, etc.) and/or network interface device 640. A network interface device, such as network interface device 640, may be utilized for connecting computer system 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 644, may employ a wired and/or a wireless mode of communication. In general, any network topology may be used. Information (e.g., data, software 620, etc.) may be communicated to and/or from computer system 600 via network interface device 640.

Computer system 600 may further include a video display adapter 652 for communicating a displayable image to a display device, such as display device 636. Examples of a display device include, but are not limited to, a liquid crystal display (LCD), a cathode ray tube (CRT), a plasma display, a light emitting diode (LED) display, and any combinations thereof. Display adapter 652 and display device 636 may be utilized in combination with processor 604 to provide graphical representations of aspects of the present disclosure. In addition to a display device, computer system 600 may include one or more other peripheral output devices including, but not limited to, an audio speaker, a printer, and any combinations thereof. Such peripheral output devices may be connected to bus 612 via a peripheral interface 656. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for carbon emission optimization using machine-learning, wherein the apparatus comprises:
   at least a processor; and
   a memory communicatively connected to the at least a processor, wherein the memory contains instructions configuring the at least a processor to:
   receive an integrated logistics data collection;
   determine at least one projected carbon emission as a function of the integrated logistics data collection, wherein determining the at least one projected carbon emission comprises:
      training a carbon emission projection model using carbon emission training data, wherein the carbon emission training data comprises a plurality of logistics datasets as input correlated to a plurality of historical carbon emissions as output, wherein training the carbon emission projection model comprises:
         updating the carbon emission training data as a function of the inputs and outputs of a previous iteration of the carbon emission projection model; and
         retraining the carbon emission projection model using the updated carbon emission training data; and
      determining the at least one projected carbon emission as a function of the integrated logistics data collection using the trained carbon emission projection model;
   generate at least one transportation plan as a function of the integrated logistics data collection and the at least one projected carbon emission;
   continuously receive a current logistics datum from an external source; and
   iteratively modify the at least one transportation plan based on the current logistics datum, wherein iteratively modifying the at least one transportation plan comprises:
      identifying a carbon emission outlier as a function of the current logistics datum and the trained carbon emission projection model;
      determining at least one carbon emission offset as a function of the carbon emission outlier; and
      updating the transportation plan to incorporate the at least one carbon emission offset.

2. The apparatus of claim 1, wherein the integrated logistic data collection comprises order data, transportation data, and environmental data.

3. The apparatus of claim 1, wherein the integrated logistics data collection is associated with a plurality of temporal elements.

4. The apparatus of claim 1, wherein determining the at least one projected carbon emission comprises:
   transforming the integrated logistics data collection into a logistic vector space by generating a plurality of logistics vectors using a vector embedding technique; and
   determining a vector distance in the logistic vector space between each logistics vector of the plurality of logistics vectors.

5. The apparatus of claim 4, wherein identifying the carbon emission outlier comprises:
   projecting the current logistics datum to the logistic vector space; and
   identifying the carbon emission outlier as a function of the vector distances between the projected current logistics datum and the plurality of logistics vectors.

6. The apparatus of claim 1, wherein iteratively modifying the at least one transportation plan comprises:
   simulating the at least one transportation plan by generating a virtual scenario based on the at least one transportation plan and the current logistics datum using a simulation module.

7. The apparatus of claim 1, wherein identifying the carbon emission outlier comprises:
   detecting a carbon emission deviation as a function of the least one projected carbon emission and a plurality of historical carbon emissions using a statistical model;
   comparing the detected carbon emission deviation against a deviation threshold; and
   identifying the carbon emission outlier based on the comparison.

8. The apparatus of claim 1, wherein determining the at least one carbon emission offset comprises:
   classifying the carbon emission outlier into a plurality of carbon emission categories; and
   selecting at least one carbon emission offset from a set of pre-defined carbon emission offsets based on the plurality of carbon emission categories.

9. The apparatus of claim 1, wherein adjusting the transportation plan comprises:
   updating the integrated logistic data collection as a function of the at least one carbon emission offset; and
   retraining the carbon emission projection model using the updated integrated logistic data.

10. The apparatus of claim 1, wherein the memory comprises instructions further configuring the at least a processor to:
   transmit the at least a modified transportation plan to a user device affiliated with a user; and
   display the at least a modified transportation plan at a display device of the user device.

11. A method for carbon emission optimization using machine-learning, wherein the method comprises:
   receiving, using at least a processor, an integrated logistics data collection;
   determining, using the at least a processor, at least one projected carbon emission as a function of the integrated logistics data collection, wherein determining the at least one projected carbon emission comprises:
      training a carbon emission projection model using carbon emission training data, wherein the carbon emission training data comprises a plurality of logistics datasets as input correlated to a plurality of historical carbon emissions as output, wherein training the carbon emission projection model comprises:
         updating the carbon emission training data as a function of the inputs and outputs of a previous iteration of the carbon emission projection model; and
         retraining the carbon emission projection model using the updated carbon emission training data; and
      determining the at least one projected carbon emission as a function of the integrated logistics data collection using the trained carbon emission projection model;
   generating, using the at least a processor, at least one transportation plan as a function of the at least one projected carbon emission;
   continuously receiving, using the at least a processor, a current logistics datum from an external source; and
   iteratively modifying, using the at least a processor, the at least one transportation plan, wherein iteratively modifying the at least one transportation plan comprises:
      identifying a carbon emission outlier as a function of the current logistics datum and the trained carbon emission projection model;
      determining at least one carbon emission offset as a function of the carbon emission outlier; and
      updating the transportation plan to incorporate the at least one carbon emission offset.

12. The method of claim 11, wherein the integrated logistic data collection comprises order data, transportation data, and environmental data.

13. The method of claim 11, wherein the integrated logistics data collection is associated with a plurality of temporal elements.

14. The method of claim 11, wherein determining the at least one projected carbon emission comprises:
   transforming the integrated logistics data collection into a logistic vector space by generating a plurality of logistics vectors using a vector embedding technique; and
   determining a vector distance in the logistic vector space between each logistics vector of the plurality of logistics vectors.

15. The method of claim 14, wherein identifying the carbon emission outlier comprises:
   projecting the current logistics datum to the logistic vector space; and
   identifying the carbon emission outlier as a function of the vector distances between the projected current logistics datum and the plurality of logistics vectors.

16. The method of claim 11, wherein iteratively modifying the at least one transportation plan comprises:
   simulating the at least one transportation plan by generating a virtual scenario based on the at least one transportation plan and the current logistics datum using a simulation module.

17. The method of claim 11, wherein identifying the carbon emission outlier comprises:
   detecting a carbon emission deviation as a function of the least one projected carbon emission and a plurality of historical carbon emissions using a statistical model;
   comparing the detected carbon emission deviation against a deviation threshold; and
   identifying the carbon emission outlier based on the comparison.

18. The method of claim 11, wherein determining the at least one carbon emission offset comprises:
   classifying the carbon emission outlier into a plurality of carbon emission categories; and
   selecting at least one carbon emission offset from a set of pre-defined carbon emission offsets based on the plurality of carbon emission categories.

19. The method of claim 11, wherein adjusting the transportation plan comprises:
   updating the integrated logistic data collection as a function of the at least one carbon emission offset; and
   retraining the carbon emission projection model using the updated integrated logistic data.

20. The method of claim 11, wherein the memory comprises instructions further configuring the at least a processor to:
   transmit the at least a modified transportation plan to a user device affiliated to a user; and
   display the at least a modified transportation plan at a display device with the user device.

* * * * *